US007668576B2

(12) United States Patent
Ellenbogen et al.

(10) Patent No.: US 7,668,576 B2
(45) Date of Patent: Feb. 23, 2010

(54) INCORPORATING A PORTABLE DIGITAL MUSIC PLAYER INTO A VEHICLE AUDIO SYSTEM

(75) Inventors: Jesse Ellenbogen, Campbell, CA (US); Sung Kim, Palo Alto, CA (US); Scott M. DeWinter, Oakland, CA (US); Jose Efrain Alcorta, San Francisco, CA (US); William Richardson Jones, III, San Francisco, CA (US); Perry Anderson, Kensington, CA (US)

(73) Assignee: DashJack, Inc., Campbell, CA (US)

( * ) Notice: Subject to any disclaimer, the term of this patent is extended or adjusted under 35 U.S.C. 154(b) by 579 days.

(21) Appl. No.: 11/015,880

(22) Filed: Dec. 16, 2004

(65) Prior Publication Data

US 2006/0134959 A1 Jun. 22, 2006

(51) Int. Cl.
*H04M 1/00* (2006.01)
(52) U.S. Cl. .............. 455/575.1; 455/569.2; 455/556.1; 455/575.9; 455/90.3; 455/344; 369/86; 369/30.1
(58) Field of Classification Search .............. 455/575.1, 455/569.2, 556.1, 575.9, 90.3, 344; 379/454, 379/455; 378/454, 455; 369/86, 30.1
See application file for complete search history.

(56) References Cited

U.S. PATENT DOCUMENTS

| 3,758,119 | A | * | 9/1973 | Harlan | 360/71 |
|---|---|---|---|---|---|
| 4,811,318 | A | * | 3/1989 | Laufer | 369/30.85 |
| 4,881,910 | A | * | 11/1989 | Odemer | 439/476.1 |
| 6,785,531 | B2 | * | 8/2004 | Lepley et al. | 455/351 |
| 6,980,788 | B2 | * | 12/2005 | Peeples | 455/347 |
| 7,103,397 | B2 | * | 9/2006 | Oh | 455/575.9 |
| 2001/0006503 | A1 | * | 7/2001 | Braitberg et al. | 369/77.2 |
| 2002/0137541 | A1 | | 9/2002 | Lepley et al. | |
| 2003/0068986 | A1 | | 4/2003 | Oh | |
| 2003/0107975 | A1 | * | 6/2003 | Satoh | 369/77.1 |
| 2004/0194154 | A1 | * | 9/2004 | Meadors et al. | 725/153 |
| 2006/0039263 | A1 | * | 2/2006 | Trotabas | 369/86 |

OTHER PUBLICATIONS

PCT Search Report, mailed Mar. 31, 2008, 3 Pages.

* cited by examiner

*Primary Examiner*—Sanh D Phu
(74) *Attorney, Agent, or Firm*—Blakely Sokoloff Taylor & Zafman LLP

(57) ABSTRACT

A carriage receives and secures a portable digital music player in a vehicle audio system. The carriage is mechanically engagable with a dock of the vehicle audio system. Access and control over a portable digital music player received and secured by the vehicle audio system may be provided.

14 Claims, 23 Drawing Sheets

Incoming Phone Call

Outgoing Phone Call

INCORPORATING A PORTABLE DIGITAL MUSIC PLAYER INTO A VEHICLE AUDIO SYSTEM

PRIOR ART AND RELATED ART

BACKGROUND

1. Field

The present invention relates to the field of portable digital music players and the use of these devices in a vehicle.

2. Description of the Related Art

Portable digital music players are changing how consumers listen to music. Hard drive based devices such as Apple Computer's iPod family, Sony's Network Walkman, Creative Labs' NOMAD, and Dell Computer's DJ may store libraries of songs in a variety of formats including MP3 (MPEG Layer III), AAC (Advanced Audio Coding), WMA (Windows Media Audio), WAV, AIFF, and Ogg Vorbis. Smaller flash-based devices made by iRiver, Samsung, Rio, and Philips offer less storage space but even smaller physical sizes. Wireless communication devices such as cellular telephones and personal digital assistants (PDAs) can also be portable digital music players. Portable digital music players also use integrated displays that present information including the current track title and artist, or the file hierarchy of the tracks stored. Using internal batteries, these devices allow a user to play and take their music anywhere.

Many products exist that allow portable digital music players to play music stored in portable digital music players through the speakers of a vehicle. These products typically use one of two approaches. In the first approach, a short-range FM radio transmitter is attached to the portable digital music player and the vehicle radio is tuned to the frequency of the transmitter. The use of such a transmitter is subject to radio interference which may cause undesired results. Typically, these transmitters draw power from the portable digital music player and thereby drain the batteries of the player. Additionally, personal FM transmitters are illegal in certain countries, such as the United Kingdom, and are not a viable solution to using a portable digital music player in a vehicle.

The second approach uses a wired connection to electrically attach a portable digital music player to an input of the existing vehicle radio. Examples of this type of connection include BMW's iPod adapter solution, Alpine's KCA-420i adapter, Dension's ice>Link:iPod, and a standard cassette adapter. The wired connection typically results in a cable draped across the vehicle interior. These cables are unsightly and may interfere with driving. Often wired approaches are combined with add-on accessory cradles. These cradles have non-durable mounting methods that often detach inadvertently, however, some do provide power to the player. Vehicle-suitable translation of the user interface and controls of the player are not provided by this approach leaving a user to have to control the player using the controls of the player itself.

Another way of playing MP3s in a vehicle uses a standard or modified hard drive as a storage device for a car stereo. There are three basic variants of this setup. In the first variant, a standard hard drive in a custom casing is inserted into a head-end unit. The hard drive stores digital music files. However, there is no internal power source and an AC adaptor is required for use of the hard drive outside of the car stereo. A built-in display is also not included for the hard drive casing. Just simple playback buttons are provided. The head-end unit has no flexibility in what hard drive case it accepts. In the second variant, a standard hard drive is installed in a custom casing. This casing is then externally connected to the existing car stereo through inputs provided by the car stereo. In the third variant, a hard drive is permanently mounted inside the head-end unit.

Some car stereos are able to read MP3s from CD-R and CD-RW discs. Generally, these stereos do not have a display capable of depicting file information such As artist and/or song name. Nor do these stereos easily navigate through a long list of Content.

SUMMARY

The present invention includes a carriage which includes an external housing to provide a mechanical engagement of the carriage into a dock, the carriage defining an internal cavity communicating with an opening, the opening to receive a portable digital music player, and an electrical connector specific to the portable digital music player disposed within the cavity to cooperative engage an electrical connector external to the carriage. The carriage further includes a sensor to determine if the portable digital music player has been properly received by the carriage.

Other aspects will be apparent from the accompanying figures and from the detailed description which follows.

DETAILED DESCRIPTION

A method and apparatus for integrating a portable digital music player into a vehicle audio system are described below. In the following description, numerous specific details are set forth in order to provide a thorough understanding of the present invention. It will be apparent to one skilled in the art, that the present invention may be practiced without these specific details. In other instances, well-known designs and implementations are not described in detail in order to facilitate description.

Vehicle audio systems typically use a head-end unit, which is an electronic chassis that houses an amplifier, user controls, a display on the outer face, a radio tuner, and optionally a CD player or tape deck. These head-end units are in turn connected, either directly or through additional audio gear, to the speakers of a vehicle.

For purposes of connecting a portable digital music player to the head-end unit, the embodiments described herein allow a portable digital music player (at times referred to as "player") to be treated in much the same manner as a piece of pre-recorded media such as a CD or cassette. A player is inserted into a designated cavity that houses the player and provides an electrical, optical, or wireless interface between the player and the audio system. This allows music stored on the portable music player to be accessible to the audio system. In one embodiment, the use of controls and a display to determine what music content is available on the player, allow the selection of desired content, and allow the manipulation of the playback characteristics of the content including, but not limited to, volume, sound equalization, pausing, track forward and reverse, and visualizations such as a graphic spectrum analyzer.

A large variety exists in the in-dash space of vehicles and in the physical dimensions and connections of portable digital music players. In order to service the greatest amount of vehicles and portable digital music players, a modular approach is adopted to better incorporate a portable digital music player into an audio system. This approach uses interchangeable parts such that different types of players may be used with the audio system. Of course, it should be understood that the audio system may be designed to work with only one type of player and not strictly use a modular approach.

Figure 1:
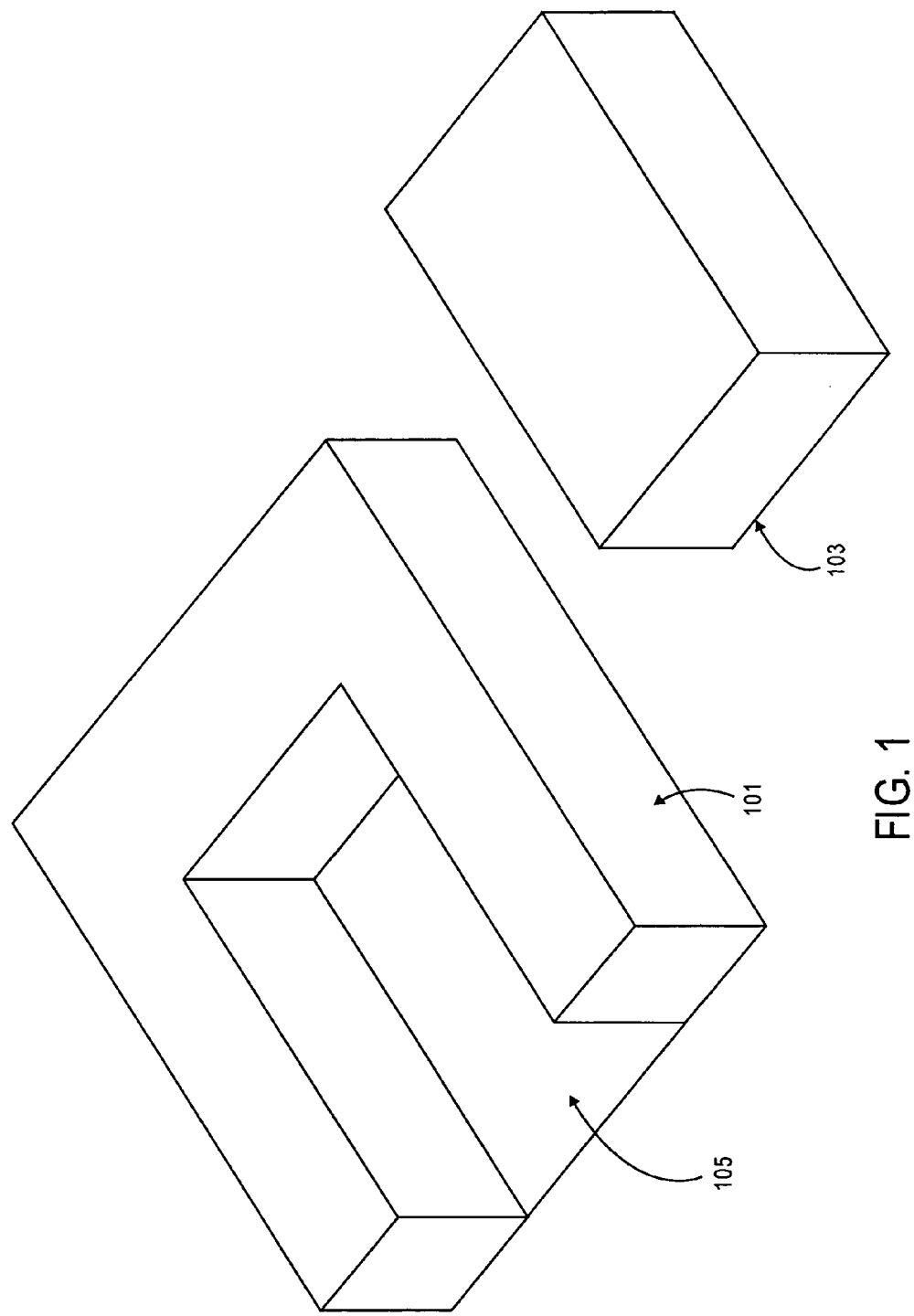
FIG. 1 is a perspective view of an exemplary embodiment of a vehicle audio system.

Referring first to FIG. 1, the audio system includes a carriage dock 101 and a carriage 103. The carriage 103 may be inserted into the carriage dock 101 through an opening 105 and held in place by a triggering mechanism. A portable digital music player utilized by the audio system may be inserted and housed in the carriage 103. The carriage 103 is removable from the dock 101 and replaceable with a different carriage designed to house a different portable digital music player.

Figure 2:
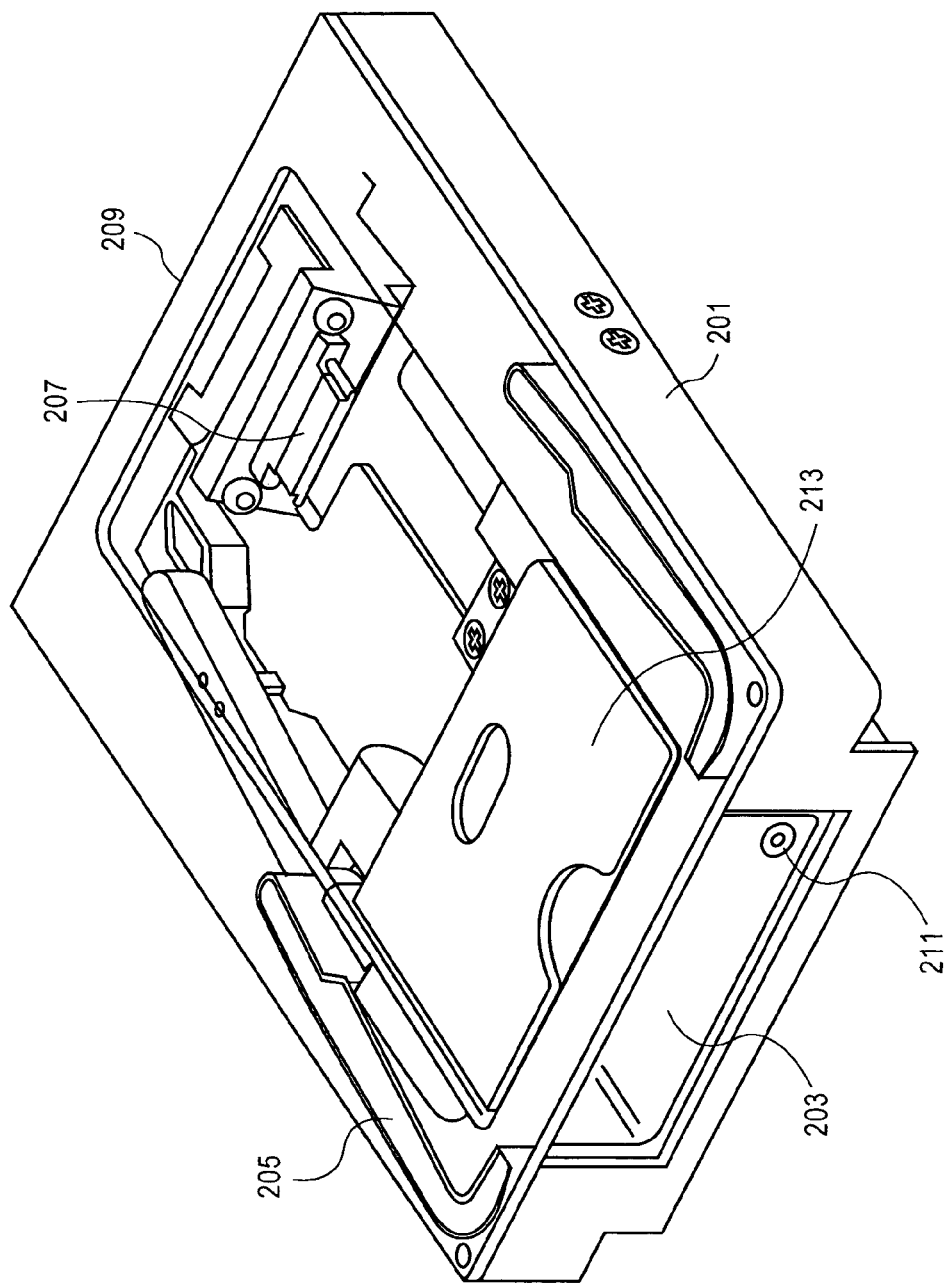
FIG. 2 is a perspective view of an embodiment of a carriage.

A depiction of an embodiment of a carriage 103 is shown in FIG. 2. An opening 203 large enough to admit a portable digital music player is in an edge of the carriage 201. In one embodiment, the opening 203 is designed to specifically admit a particular portable digital music player and another player. By way of example, a larger size opening 203 would be used for a full size Apple iPod and a smaller size for the Apple iPod mini. In an alternative embodiment, the opening 203 is a universal size that is large enough to accept most portable digital music player.

A movable shuttle 213, internal to the carriage 201, holds a portable digital music player when one is inserted. A player may be inserted through the opening 203 into the shuttle 213. In one embodiment, the shuttle 213 has at least one internal pawl to aid in the securing of the portable digital music player. A pawl exerts pressure and/or friction on the exterior of the portable digital music player and thereby restricts its movement. One or more optional pushrods 205 on either side of the shuttle 213 may also aid in the securing of the portable digital music player. A pushrod includes an end to exert pressure on the exterior of the portable digital music player in such a manner as to secure it from falling out of the shuttle. The pushrod also aids in moving the portable digital music player to specific positions.

The shuttle 213 is movable toward another end of the carriage 201. An inserted portable digital music player makes an electrical connection through an opening or gap in the shuttle 213, with a portable digital music player-specific connector 207 when the shuttle 213 is moved to that end. Exemplary connectors 207 include, but are not limited to, IEEE 1394, USB serial, and the Apple iPod docking connector. The portable digital music player-specific connector 207 is attached to a common internal connector interface 209 that is housed in the carriage 201. This interface 209 translates the specific connector 207 into a standard connection. Accordingly, there is always a standard connection from the carriage 201, regardless of the specific connector used. This allows for greater flexibility in the design of future carriages to adapt to new players as they are developed$_{[JE1]}$ In another embodiment, if the player is connected to the audio system using an optical or wireless (RF) connection. Exemplary optical connections include, but are not limited to, infrared (IR) and laser. Exemplary wireless connections include, but are not limited to, Bluetooth and the IEEE 802.11 family. In one embodiment, wireless connectivity does not require that the player be inserted into the head-end unit.

In an embodiment of the shuttle 213, the interior of the shuttle 213 is lined with a surface that will not scratch the portable digital music player held by the shuttle 213. Exemplary surfaces include, but are not limited to, felt and soft cotton.

In yet another embodiment, the shuttle 213 dimensions are adjustable and not player specific. The shuttle 213 may adjust in at least one of the three dimensions to securely hold the player. In one embodiment, this adjustment to the shuttle 213 is made by a user. In another embodiment, the adjustment is automatically performed by the audio system until a sensor in the carriage 201 determines the player is held securely in place.

In one embodiment, at least the device-specific connector 207 and shuttle 217 are mounted such that slight movement with the player inserted is possible. This movement helps with the absorption of shock experienced during vehicle movement. Exemplary mounts include springs and hydraulics.

In one embodiment, the carriage 201 incorporates at least one sensing device 211. The device 211 is used to determine if a portable digital music player is present and has made a connection with the specific connector 207. This determination may be achieved by finding the amount of time that has elapsed since insertion and the status of the sensor 211 after a set period of time. The sensor 211 will be triggered upon insertion, and as the dimensions of the portable digital music player are known and the portable digital music player will be moved toward the specific connector 207 in the movable shuttle 213 at a known rate of speed, if the sensor is still detecting the presence of the portable digital music player when it should not be, the portable digital music player is deemed to have not made a connection and is ejected.

Many other sensing capabilities may be incorporated into the audio system. In one embodiment a signal is generated once the specific connector 207 has or has not made contact with the portable digital music player. This signal may be used to alert a user that the player is fully inserted into the shuttle 213. It may also be used to alert a user that the wrong type of player has been inserted and that the audio system cannot make the proper connection, resulting in an unsuccessful insertion. Upon an unsuccessful insertion, the player is rejected. In one embodiment, a signal is generated upon disconnection of the player with the specific connector 207. Disconnection could occur during operation, requiring a reset of the player to resume normal operation. Disconnection may also be intentional, as is the case for ejecting the player from the audio system.

Figure 3:
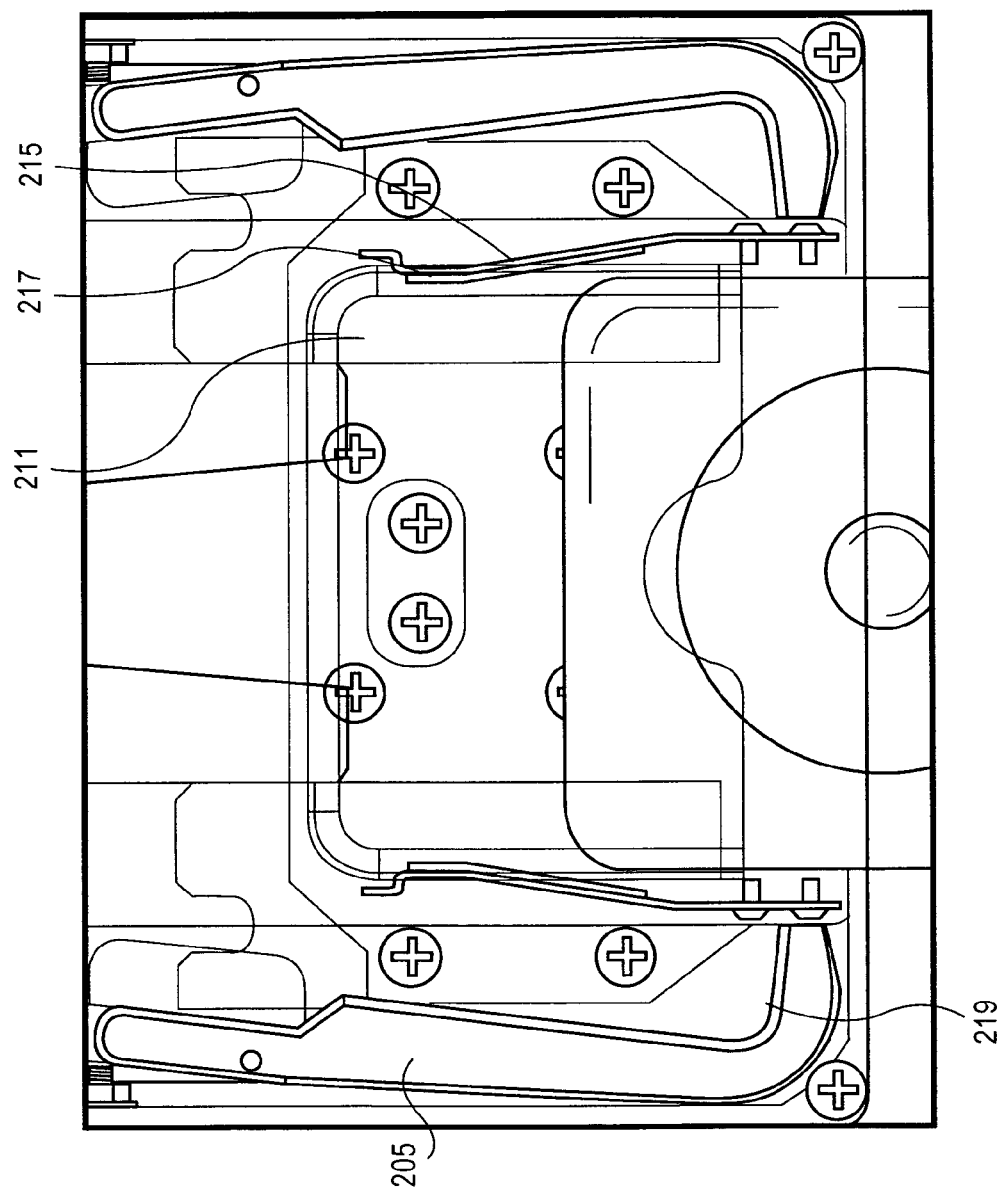
FIG. 3 depicts an embodiment of a shuttle.

A closer view of the shuttle 213 and surrounding area is depicted in FIG. 3. A portable digital music player has been partially inserted into the shuttle 213. The player is close to making contact with a pawl 215 that exerts pressure and/or friction on the player to help restrict its movement. In one embodiment, the pawl 215 is covered in padding 217. Exemplary pawl padding 217 includes, but is not limited to, rubber and elastomers. This padding helps maintain a strong hold on the player while not scratching the surface.

Also depicted are the pushrods 205 that aid in the movement in the shuttle 213. In one embodiment, once the shuttle 213 has moved with the player to a position near the specific connector 207, the pushrods 205 automatically articulate into a position where they may push the player from the side of the case of the player opposite the specific connector 207. The pushrods 205 then move the player through the final phase of its travel, assuring a controlled mating to the specific connector 207, and not relying on excessive pressure and friction from pawl 215 to overcome the mating force of specific connector 207. In one embodiment, at least a tip of a pushrod 205 is covered in padding 219. Exemplary pushrod padding 219 includes, but is not limited to, rubber and elastomers.

Figure 4:
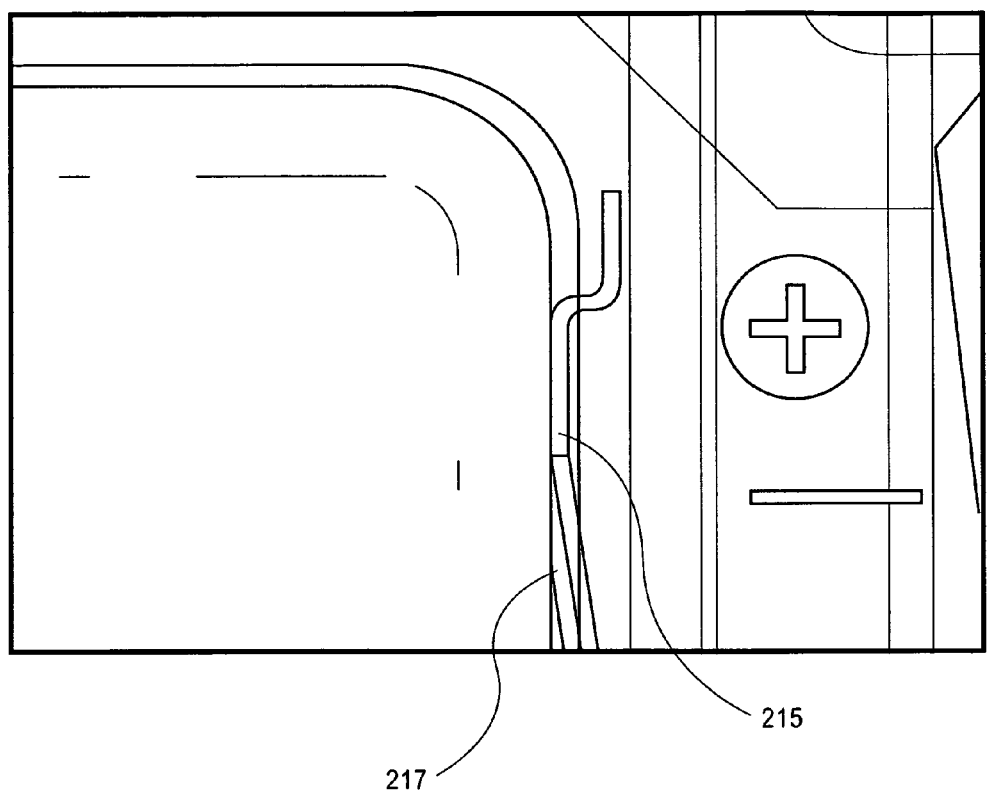
FIG. 4 illustrates a portable digital music player completely inserted into a shuttle of one embodiment.

A portable digital music player has been completely inserted into the shuttle 213 in FIG. 4. A pawl 215 and its padding 217 have made contact with a portion of the player. At this point the shuttle is either ready to be moved into the carriage or the player is ready to be removed form the shuttle.

Figure 5:
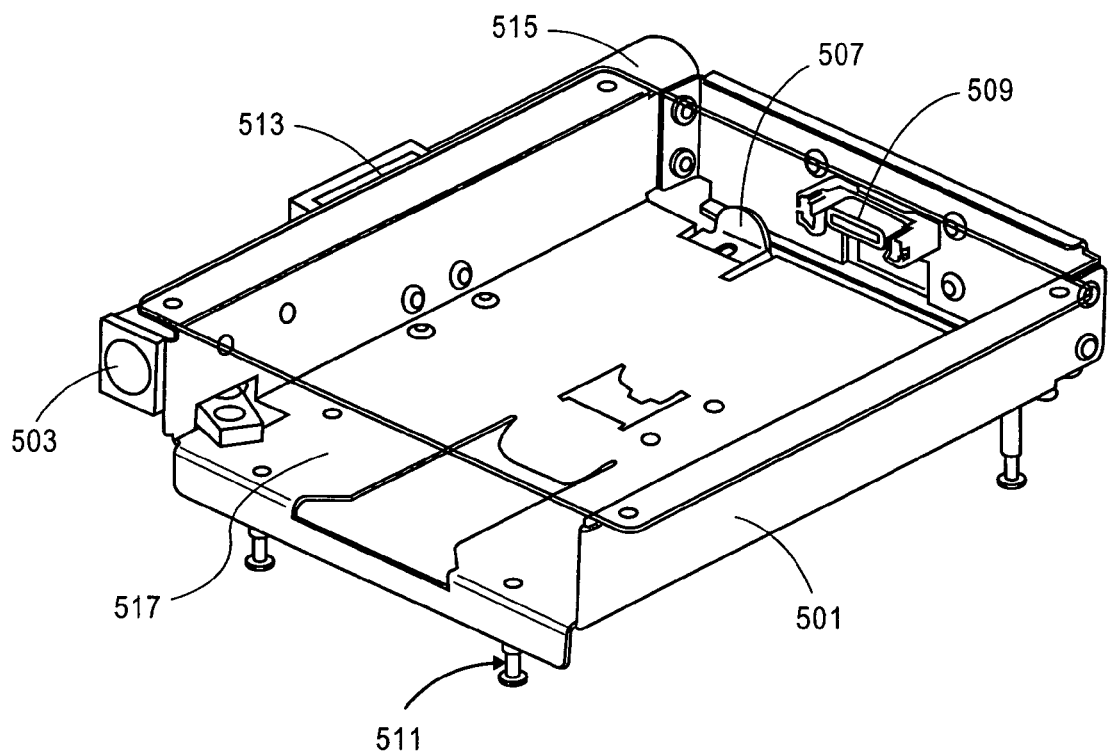
FIG. 5 is a perspective view of an embodiment of a carriage dock.

A depiction of an embodiment of a carriage dock 501 compatible with a carriage is shown in FIG. 5. This carriage dock 501 houses the carriage during normal operation if a carriage has been inserted. An opening 517, large enough to admit the carriage, is in the front of the carriage dock 501. To change the type of portable digital music player used by the audio system, the carriage is removed and a new carriage designed to fit that type of portable digital music player is inserted through the opening 517 into the dock 501.

In one embodiment, a manual release trigger 503 for the carriage is provided. This release trigger 503 will cause an ejector 505 to at least partially force out a carriage inserted into the dock 501. In another embodiment, the carriage is automatically released without the use of the manual release trigger 503. A reset mechanism 507 may also aid in the ejection of the carriage. This reset mechanism 507 resets the release trigger 503. The reset mechanism 507 also helps secure the carriage while it is inserted in the dock 501. In another embodiment, the carriage has a reset button to trigger an ejector to force it out. In yet another embodiment, the carriage is removable without the use of a trigger release.

The carriage dock 501 includes a common internal connector 509. The common internal connector of the carriage mates with this connector 509 when a carriage is inserted. This common internal connector 509 is further connected to the electrical components of the audio system head-end unit. The use of a common internal connector 509 allows for the carriage to be easily interchangeable no matter what portable digital music player is used. This is because regardless of the player-specific connector, the common internal connector of the carriage is compatible with the common internal connector 509 of the dock 501. By way of example and not limitation, the common internal connector 509 is attached to a printed circuit board (PCB) containing circuitry for the audio system. Exemplary PCB circuitry includes, but is not limited, a digital signal processor (DSP), a processor, non-volatile memory, volatile memory, a tuner module, an amplifier, a power supply, driver circuitry o for a motor, and a control interface. In an alternative embodiment, the internal connector is directly connected to the PCB.

In one embodiment of the carriage, memory stores machine code that at least identifies the type of portable digital music player that is being inserted. Upon a successful docking of the carriage, this code is transmitted to the PCB to update the firmware of the audio system if necessary. Updating the firmware ensures that the audio system components are optimized to work with that particular type of portable digital music player.

Standoffs 511 provide clearance for the PCB. Depending upon the design configuration, the PCB may either be attached to the carriage dock 501, carriage, or to a chassis housing the carriage dock 501.

In one embodiment of the carriage dock 501, a motor 515 and a transmission 513 are used to automatically move the shuttle 213. After a player is inserted, the motor 515 engages the transmission 513, which in turn moves the shuttle. In another embodiment the shuttle is manually moved.

Figure 6:
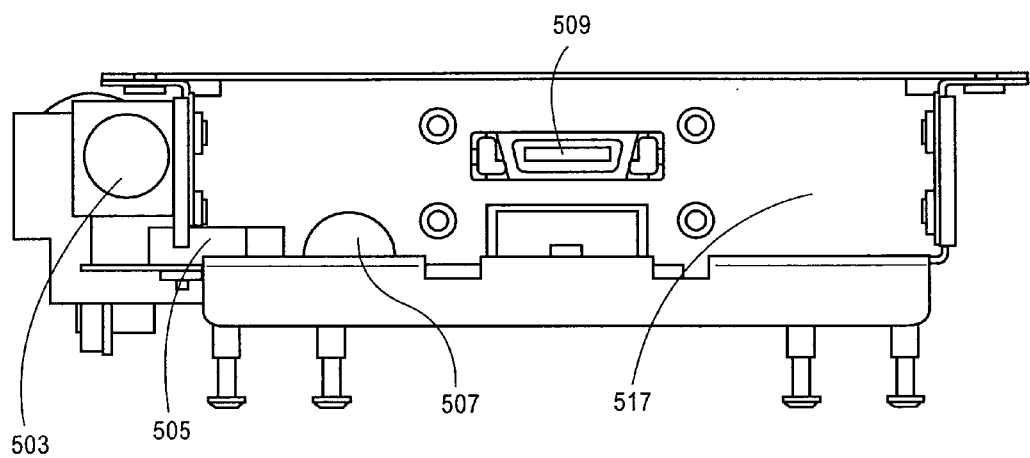
FIG. 6 is a frontal view of an embodiment of a carriage dock.

A front view of the carriage dock 501 is depicted in FIG. 6. Through the opening 517, the common connector 509 can be seen. The ejector 505 and reset mechanism 507 in conjunction with the reset trigger 503 provide for the manual removal of a carriage after it has been inserted and locked into place.

Figure 7:
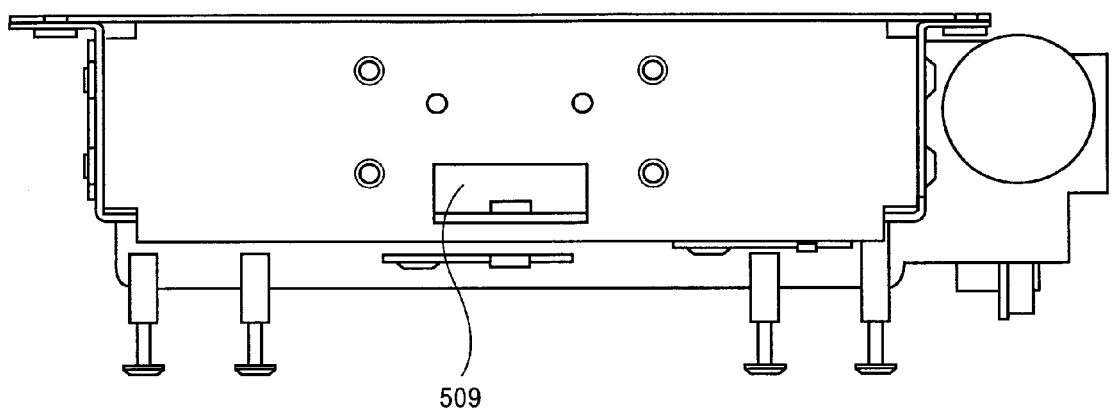
FIG. 7 is a rear view of an embodiment of a carriage dock.

FIG. 7 depicts an embodiment of a rear view of the carriage dock of FIG. 5. An opening provides access to the common connector 509. Through this opening the common connector 509 may be connected to a PCB. Of course, in other embodiments the common connector 509 is output somewhere other than the rear of the dock 501 (for example, through a side).

Figure 8:
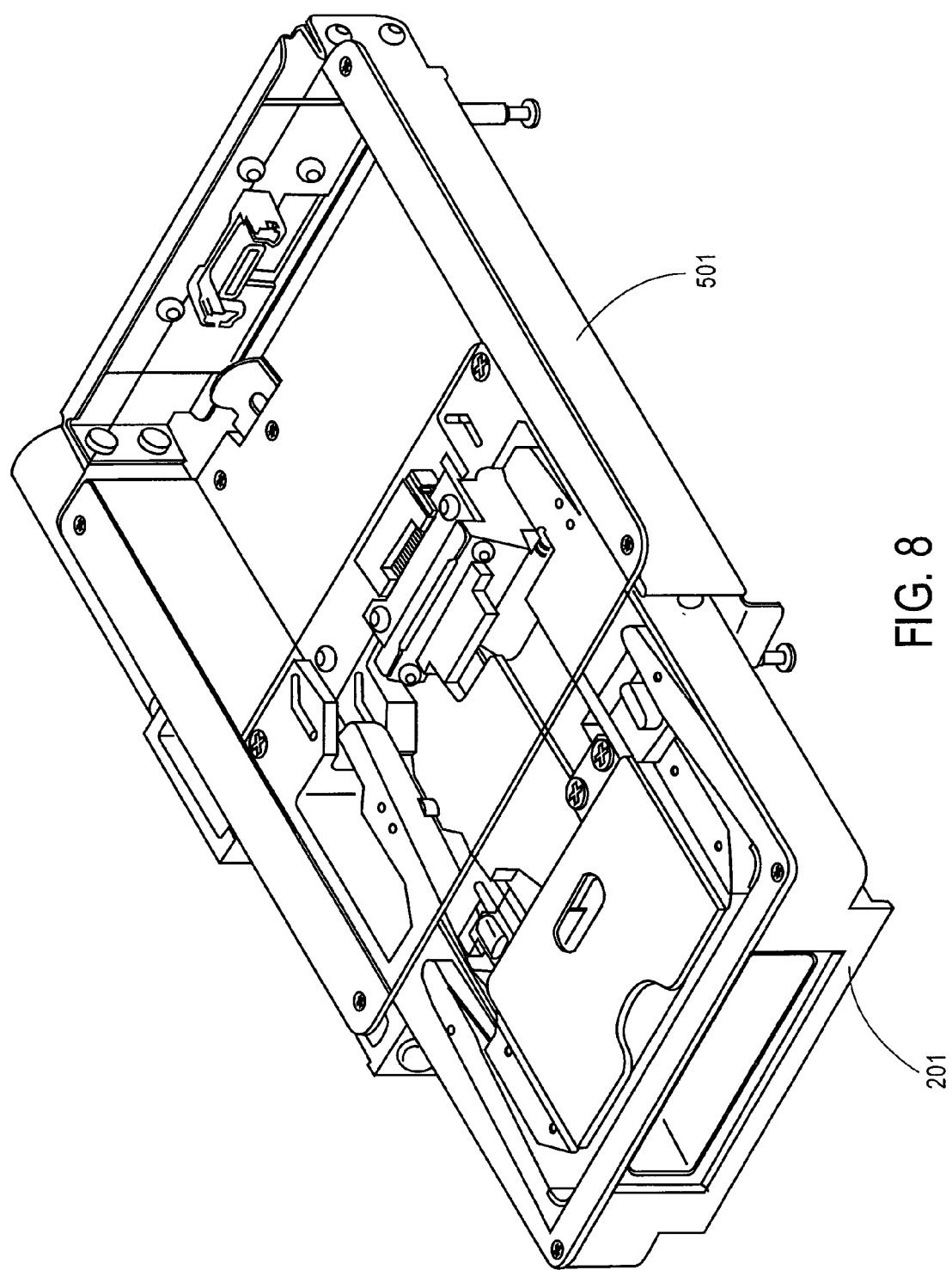
FIG. 8 illustrates the insertion of an embodiment of a carriage into an embodiment of a carriage dock.

FIGS. 8 through 13 depict the carriage of FIG. 2 and dock of FIG. 5 being coupled together along with the insertion of a player. It should be understood that other embodiments of the carriage and dock may be used in similar manners. FIG. 8 illustrates the insertion of the carriage of FIG. 2 into the carriage dock 501 of FIG. 5. As the carriages are interchangeable, the same carriage dock may be used with multiple portable digital music players by simply using an appropriate carriage tailored for that portable digital music player. With this capability the audio system does not become obsolete when a new player is developed.

Figure 9:
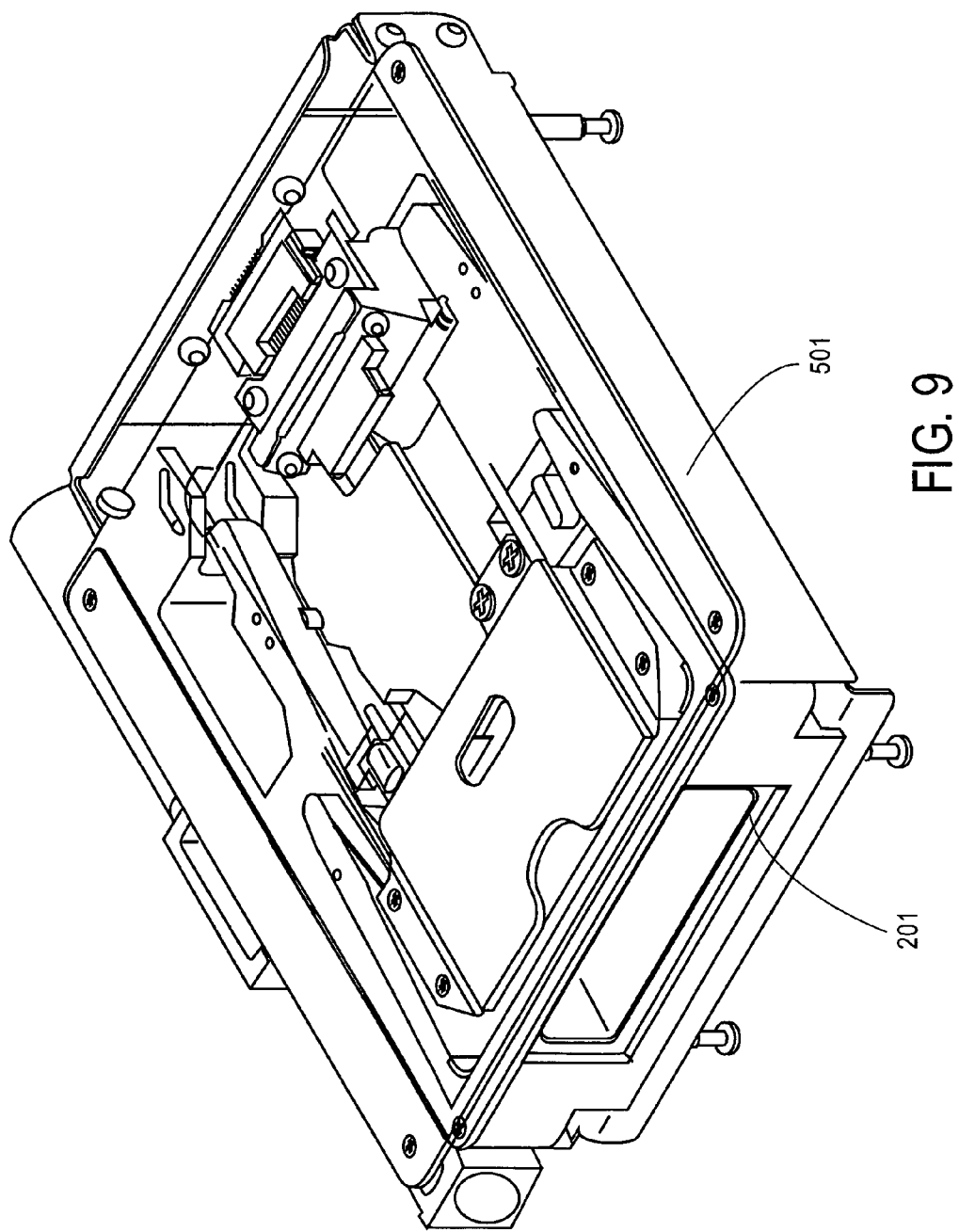
FIG. 9 depicts an embodiment of a carriage fully inserted into an embodiment of a carriage dock.

FIG. 9 depicts the carriage of FIG. 2 fully inserted into a carriage dock 501 of FIG. 5. In the embodiment depicted, the carriage may be removed by pressing the trigger 503 which was reset upon the full insertion of the carriage. In another embodiment, the carriage is automatically released from the dock 501 upon an event occurrence. Exemplary occurrences that may trigger the automatic release or removal of the carriage include, but are not limited to, power being turned off to the audio system, changing from portable digital music player mode, and selection of an ejection button on a faceplate of the audio system.

Figure 10:
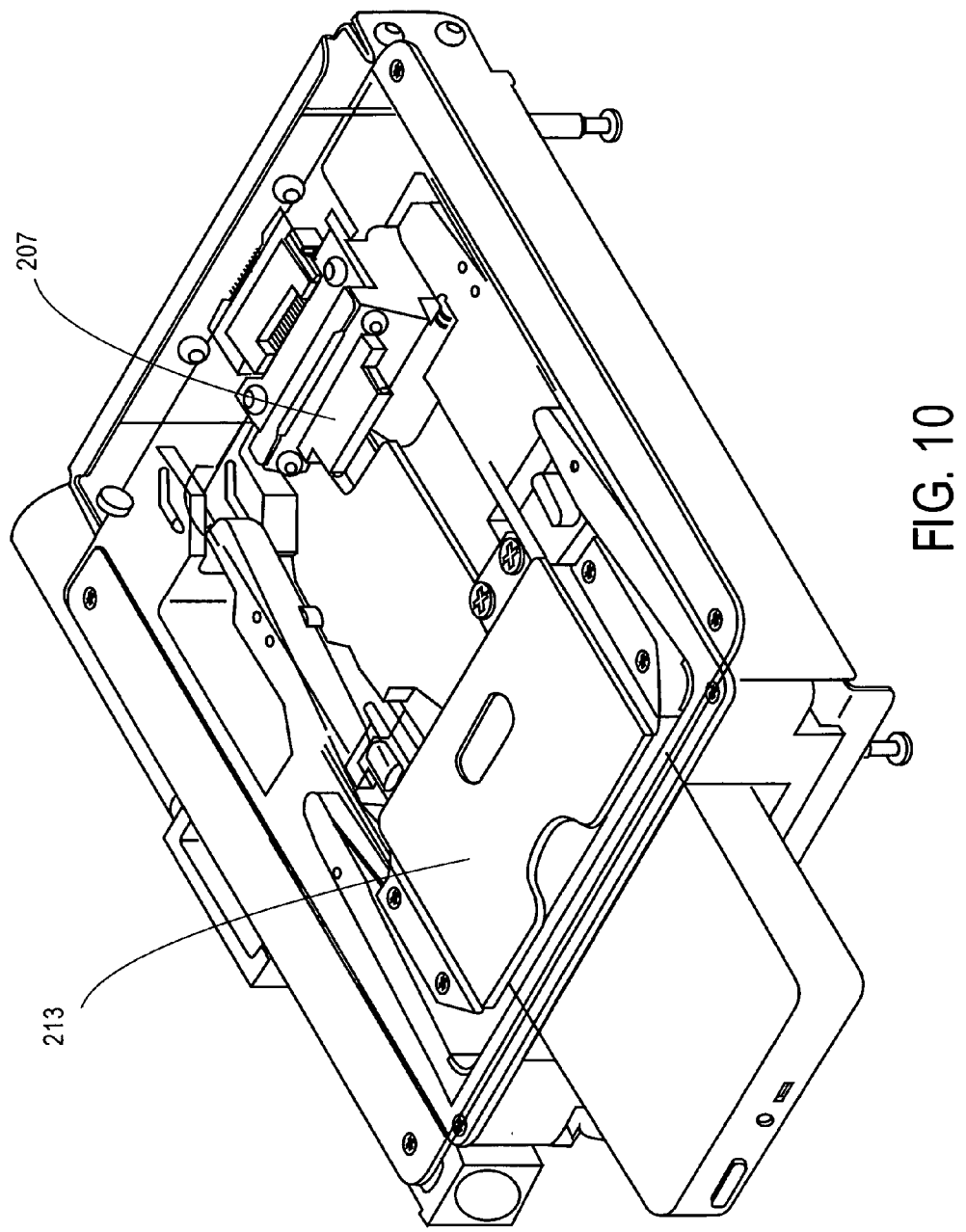
FIG. 10 illustrates an embodiment of a portable digital music player inserted fully inserted in to a shuttle of a carriage.
Figure 11:
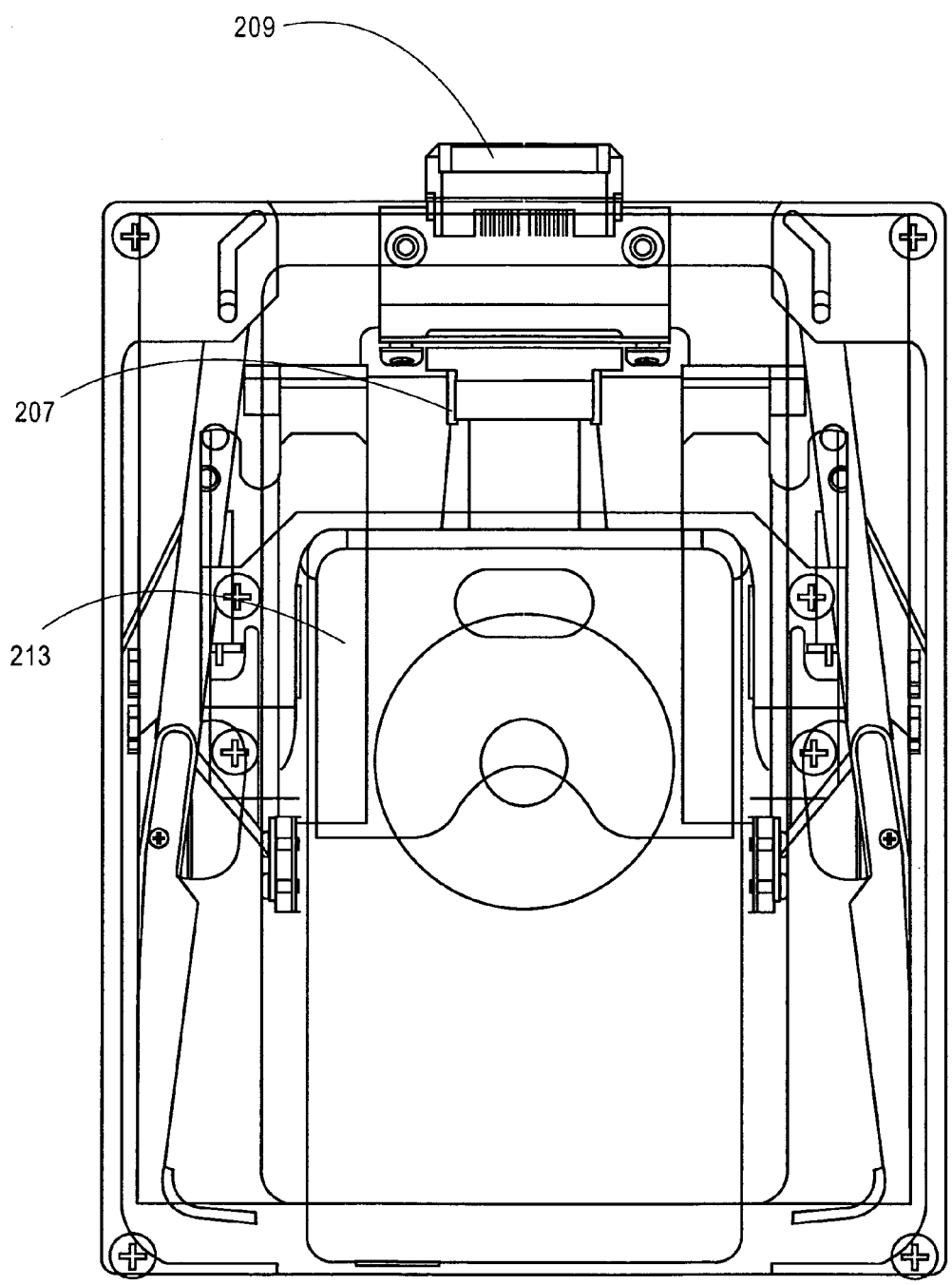
FIG. 11 depicts an embodiment of shuttle with a portable digital music player moving toward a portable digital music player-specific connector.

A portable digital music player is inserted fully in the shuttle 213 of FIG. 2 in FIG. 10. At this point the player is either ready to be removed from the shuttle 213 or the shuttle 213 is ready to move toward the portable digital music player-specific connector 207. FIG. 11 depicts the shuttle 213 with the player moving toward the portable digital music player-specific connector 207. Also show is the common connector that is outside of the cavity.

Figure 12:
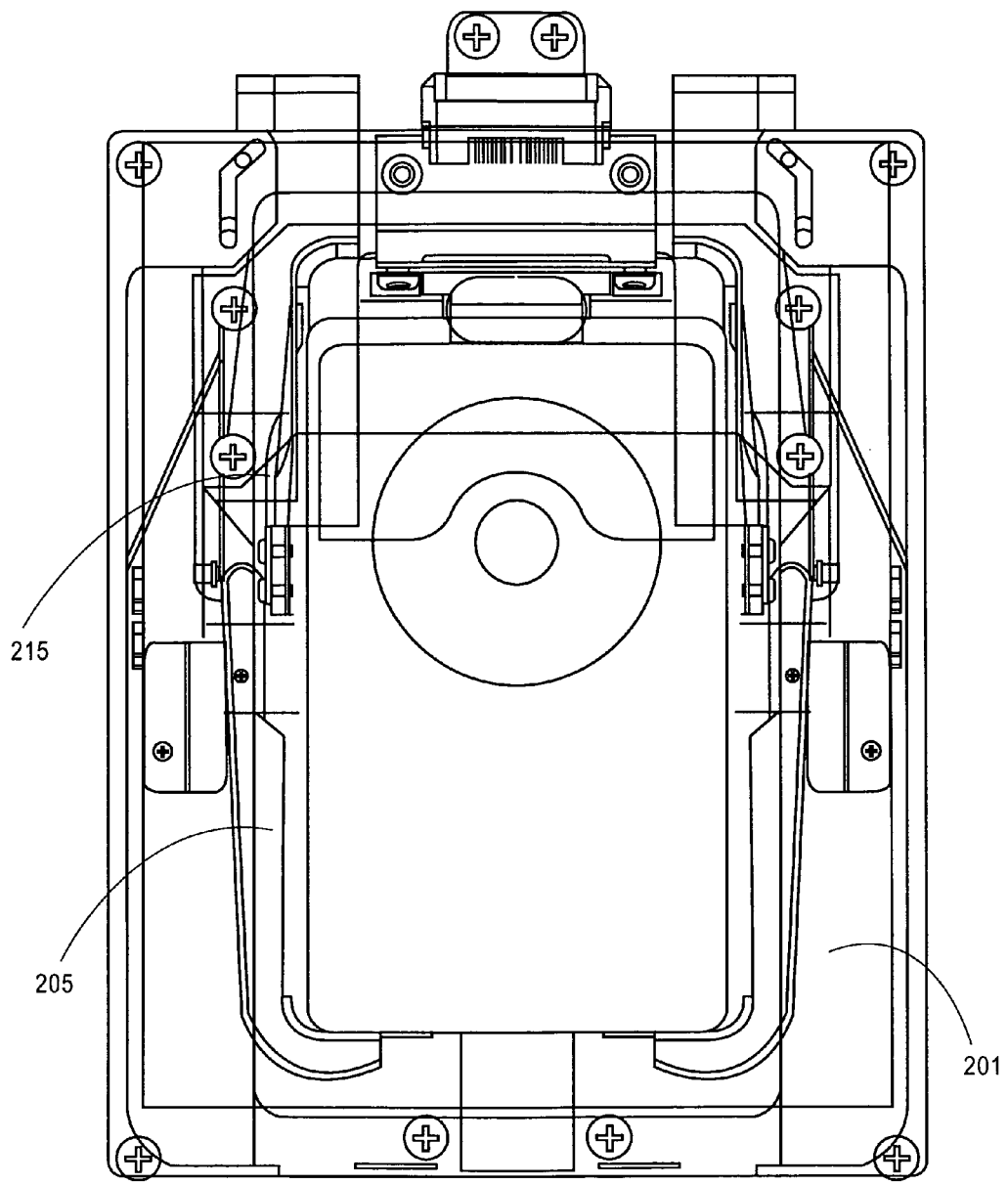
FIG. 12 illustrates an embodiment of a carriage with a connected portable digital music player.

FIG. 12 illustrates the carriage 201 of FIG. 2 with a connected portable digital music player. The player is secured by pawls 215 and pushrods 205. In one embodiment, pushrod 205 tips make contact with the player in order to secure it. In another embodiment the pushrod 205 tips do not make contact but leave a small enough gap between the tips and the edge of the player that movement by the player is minimal. This small gap allows for the player to shift slightly but still make a good electrical (wired) or optical contact with the portable digital music player-specific connector 207. In an alternative embodiment, the player has been set into the position manually before inserting the carriage 201 into the dock 501.

Figure 13:
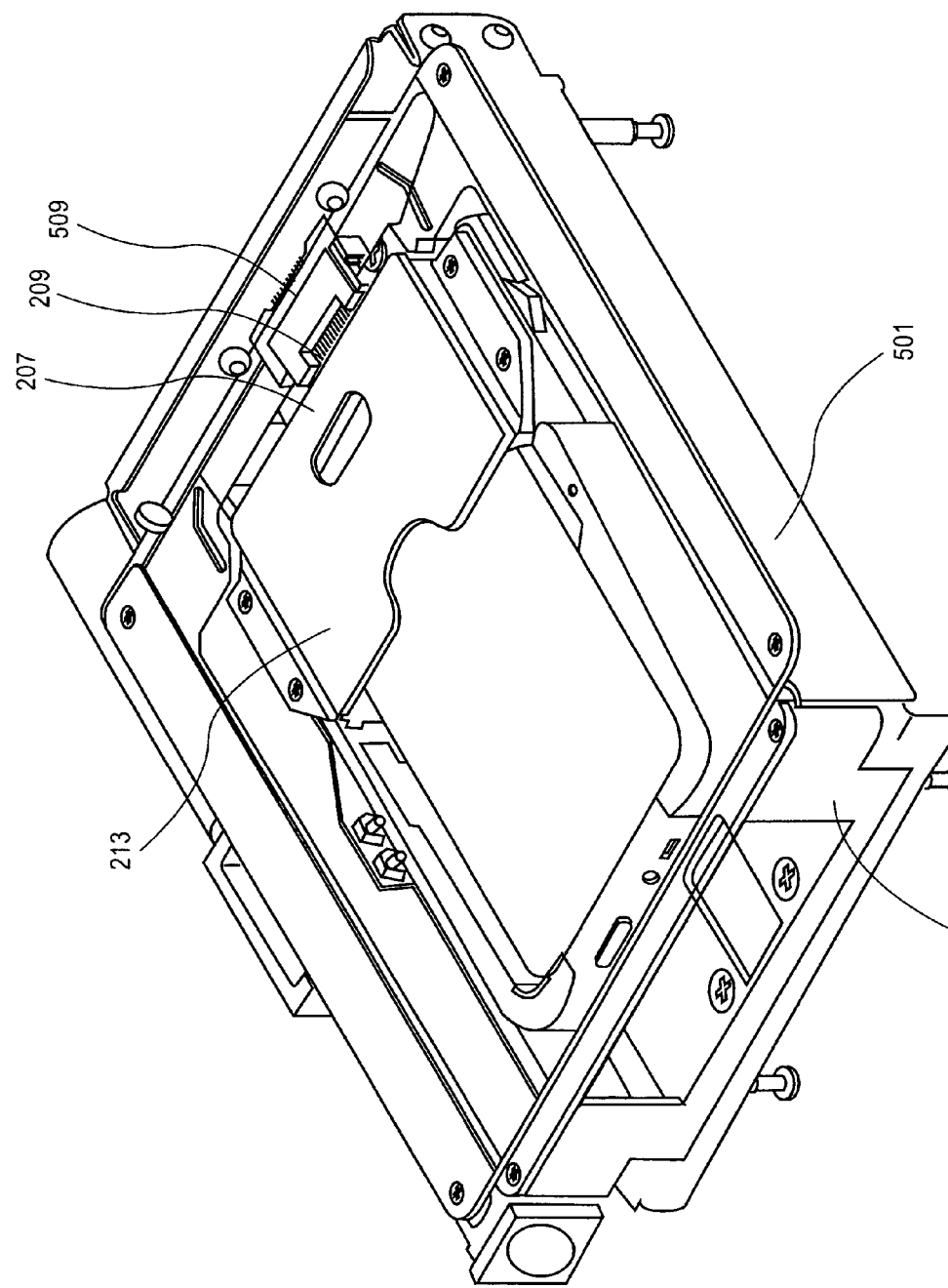
FIG. 13 illustrates an embodiment of a portable digital music player connected to the carriage dock.

FIG. 13 illustrates a connected portable digital music player in the shuttle 213 of the carriage 201 of FIG. 2 that has also been connected to the carriage dock 501 of FIG. 5. Data from the player is transferred through its external data connection, to the portable digital music player-specific connector 207, to the common internal connector 209 of the carriage 201, to the common internal connector 509 of the carriage dock 501, to the PCB (not depicted). Data transferred includes, but is not limited to, audio files, audio file information, audio stream, and file hierarchy.

There are several embodiments of the carriage and carriage dock approach. For example pawls, pushrods, motors, transmissions, release devices, stand-offs, and sensors may be unnecessary and/or shifted from the carriage to the dock or the dock to the carriage. In most embodiments, however, the dock 101 and carriage 103 both have at least one connection device to allow communication between a player inserted into a carriage that has been docked. Some exceptions to this generalization are found below.

In one embodiment of the carriage, a custom cavity is utilized to secure the portable digital music player. This cavity is designed to tightly fit the portable digital music player and allow a minimal, if any, amount of movement. In one embodiment, the cavity houses the portable digital music player-specific connector such that the player is already connected to the specific connector upon insertion of the player. With this configuration, upon full insertion of the carriage in the dock with the player inside, a connection is made to the player between the common internal connector of the carriage and dock without further movement of the player. In another embodiment, the cavity does not house the device-specific connector but has an opening that allows for the device-specific connector to connect to the player. In an embodiment, the carriage does not have pawls or pushrods.

In one embodiment, the carriage performs a drop-down function similar to a VCR or car cassette deck. The player is inserted and at least a portion of the carriage, the portion with the player, is lowered. Once lowered, the player is connected to the player specific connector. In this embodiment, the player is at least partially kept in place by the lip that the drop-down function created with the front of the audio system. In one embodiment, the carriage does not have pushrods. In another, the carriage does not have pawls.

In another embodiment, the shuttle of the carriage encases at least a portion of the player and holds the player in place only using pawls. In yet another embodiment the shuttle of the carriage encases at least a portion of the player and holds the player in place using friction without pawls. The shuttle is custom fit to create a fit in which the player has little to no movement. In either of these embodiments, the carriage does not have any pushrods as the shuttle is sufficient to hold the player.

In one embodiment the shuttle is stationary and a player is simply inserted and makes a connection to the player-specific connector without any movement of the shuttle. The player is frictionally held in place by the shuttle. In an embodiment, the carriage does not have pushrods.

In one embodiment, the player is further restricted in movement by a vacuum upon connection to the player-specific connector. In another embodiment, the player is magnetically held in place. Of course, appropriate shielding for the hard drive may be necessary to magnetically hold a hard drive based player in place.

In another embodiment, the carriage has a movable tray instead of a shuttle and pushrods. This tray ejects, similar to a CD-ROM drive tray, and has a custom cavity to fit the player. In an alternative embodiment, the cavity is adjustable to fit the dimensions of the specific player. When the tray is retracted into the carriage with a player inserted, a connection is made between the player and the player-specific connector. It yet another embodiment, the carriage is a tray of the dock.

In another embodiment, the carriage is player-specific and not removable. The carriage firmly holds in place a player that is inserted in. In an exemplary embodiment, the player is frictionally held in place by pawls.

In one embodiment of the audio system, a cover is attached to the audio system after a player is inserted. The cover at least partially covers the player and aids in securing the player by sealing the player in the carriage. The cover also provides a layer of protection for the player and audio system from spills, accidental removal, and unwanted movement.

In one embodiment of the audio system, the player-specific connector provides direct connectivity with a player and the PCB. In another embodiment, the player-specific connector is attached to a common internal connector in the carriage that is connected to common internal connector in the dock. The common internal connector of the dock is connected to the PCB.

In one embodiment, only data about a music file, its hierarchy and state is transmitted from the player through the player-specific connector to the audio system. The audio system receives music stored in the player by utilizing a direct output stream from the player. In another embodiment, the player is simply mounted as a storage device. Data, including music files and file information, is transmitted from the player to the audio system. The audio system uses this data to at least play each song, navigate the file hierarchy, and get information for each song from the file itself. In yet another embodiment, the audio system does not mount the player as a storage device but uses player-specific protocols to communicate with the player to play the music and gather information about what is being played or the file hierarchy to facilitate searching for a particular artist, song, or album. An example of a player-specific protocol is Apple Computer's Lingo serial protocol. This protocol is used by external devices in communicating with the iPod.

In one embodiment of the audio system, the carriage does not have a player-specific connector. Instead, the player-specific connector is housed in the dock. When the carriage is inserted a player makes a connection to the player-specific connector in the dock. This connector is in communication with the PCB.

In an embodiment of the dock, the dock does not include an ejection mechanism. The carriage will support that. In one embodiment the dock does not have a motor and transmission. Finally, in an embodiment of the dock, the dock does not have an internal connector.

The audio system may support several modes of operation and functions. Exemplary modes of operation include, but are not limited to, standby, portable digital music player, radio, telephone, setup, and auxiliary. Standby mode is the default mode when no other mode has been selected.

In portable digital music player mode, access to the functions and capabilities of the player is prioritized. These capabilities include, but are not limited to, file hierarchy, status, selection based on playlist, track, album, and artist name, and functionality for playing, pausing, stopping, fast forwarding, reversing, shuffling, and skipping tracks. Of course it should be understood that different players have different capabilities which may be incorporated into the audio system.

Radio mode provides access to various radio frequencies, including, but not limited to, AM and FM, HD Radio, Digital Audio Broadcasting (DAB or Eureka-147, which is presently used in Europe), and other radio frequencies used worldwide. Stations may be tuned using digital and/or analog methods. In one embodiment, the audio system may utilize the Radio Data System (RDS). RDS allows for a display to show station and song information. In another embodiment, the audio system may utilize broadcast information contained in digital IBOC or DAB broadcasts. RDS, IBOC, and DAB also allows tuning by programming type, program descriptions, hearing traffic and emergency broadcasts even when not tuned to a station, broadcast information such as song titles, artist names, stock quotes, sports scores, and weather forecasts. In one embodiment, automatic clock synchronization with official radio time is also provided.

Auxiliary mode allows for the use and control of devices external to the audio system such as a compact disc changer or satellite radio. Information relevant to this mode is shown on a display if available. For example, the disc number in a compact disc changer.

In one embodiment, the audio system provides the ability to "pause" and save the playing of audio from the radio or auxiliary source. A buffer stores the incoming audio stream until the audio system is "un-paused" or the buffer runs out of storage space. The audio system may be used to record audio without pausing the incoming stream in one embodiment. In one embodiment, the buffer is stored in volatile storage such as RAM. In another embodiment, the buffer is stored in non-volatile storage. This enables the audio system to save the audio stream even after power to the audio system is shut off. In one embodiment, the audio stored may be saved to the storage of the player.

Telephone mode provides the ability to make telephone calls using the audio system and the equipment of the vehicle. A microphone, in communication with the audio system, is used to replicate the microphone of a telephone and the speakers of the vehicle replicate the speaker of a phone. In one embodiment, the microphone is built in the audio system providing communication. In another embodiment, an external microphone is in communication with the audio system. Communication between the telephone or external microphone and the audio system may be wireless or wired depending on the capabilities of the telephone or microphone and the particular embodiment of the audio system.

Figure 14:
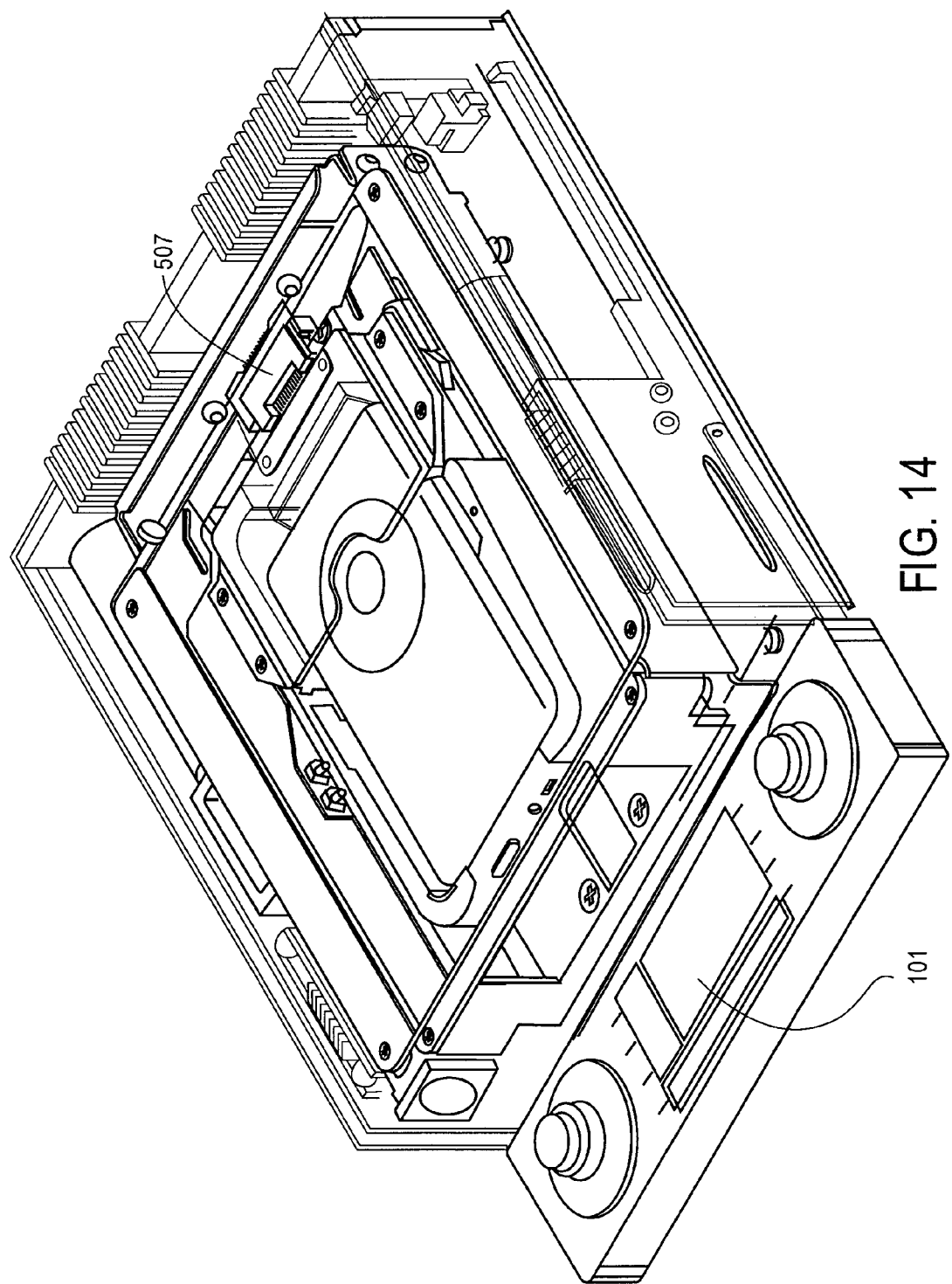
FIG. 14 depicts an embodiment of the audio system with a movable

FIG. 14 depicts one embodiment wherein the audio system includes a movable faceplate 1401. The faceplate 1401 of the audio system covers and protects internal components of the audio system, and provides access to controls for the audio system. In another embodiment, the faceplate may also serve to obscure or "stealth" the audio system, for instance, as a theft deterrent when the vehicle is turned off.

Figure 15:
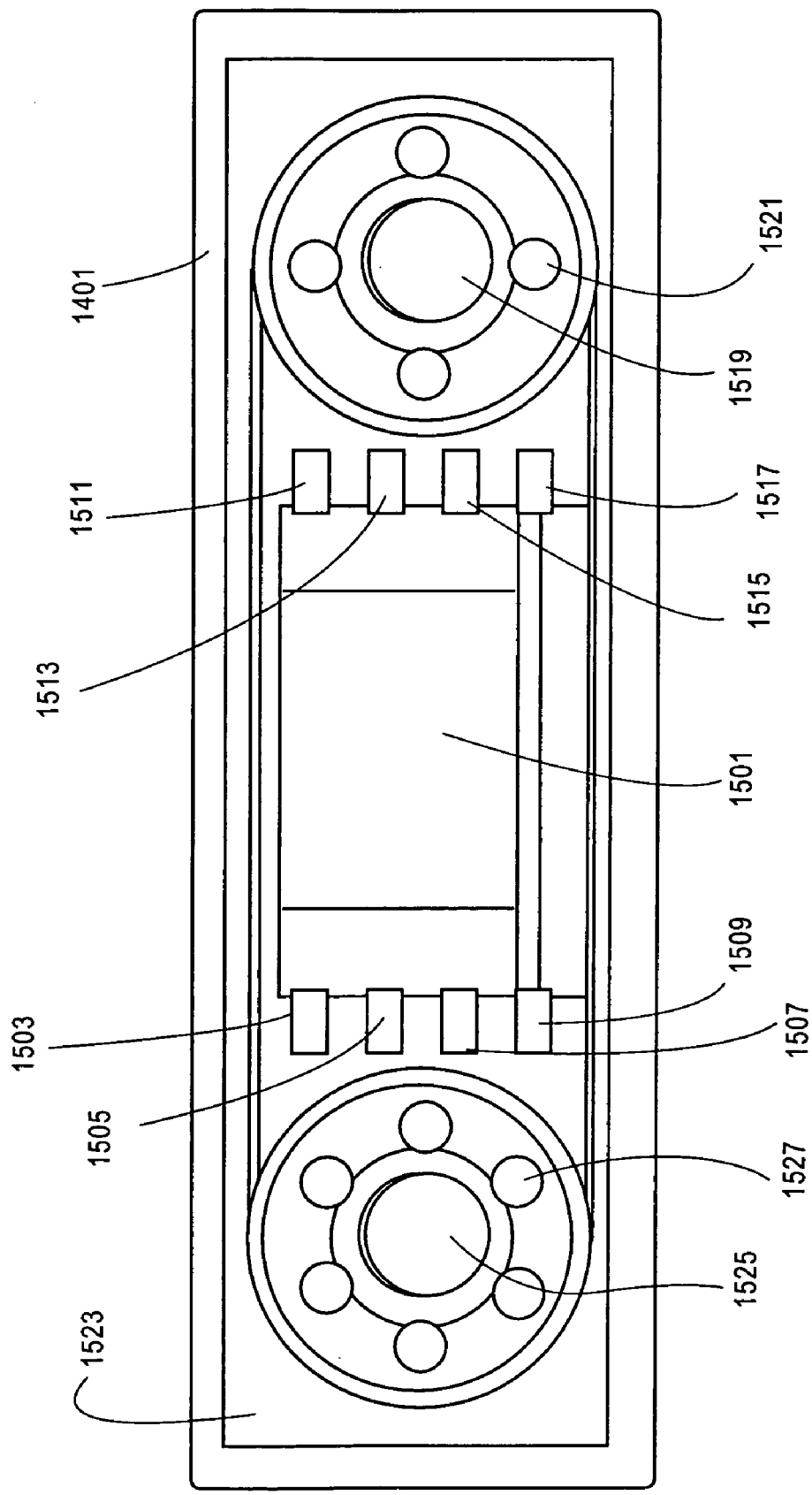
FIG. 15 illustrates an embodiment of a movable faceplate.
Figure 16:
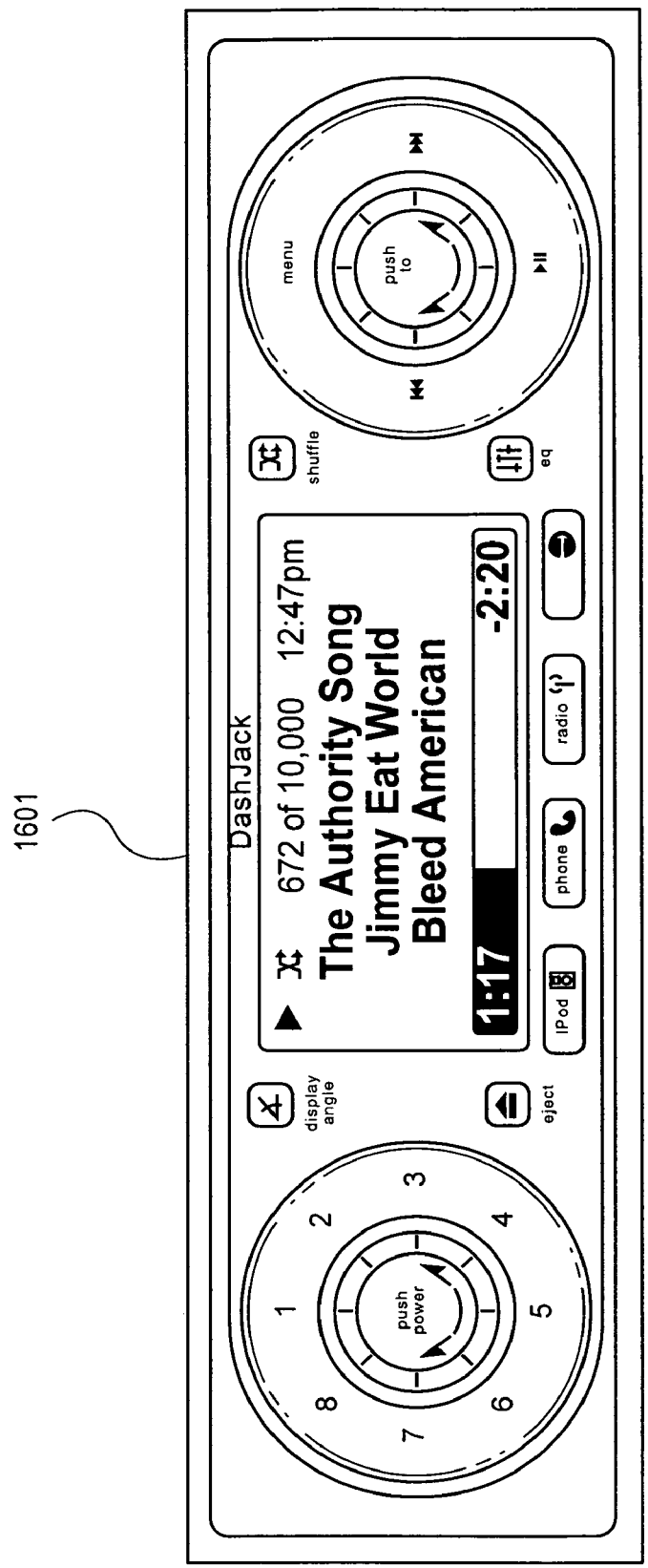
FIG. 16 illustrates an embodiment of a movable faceplate.
Figure 17:
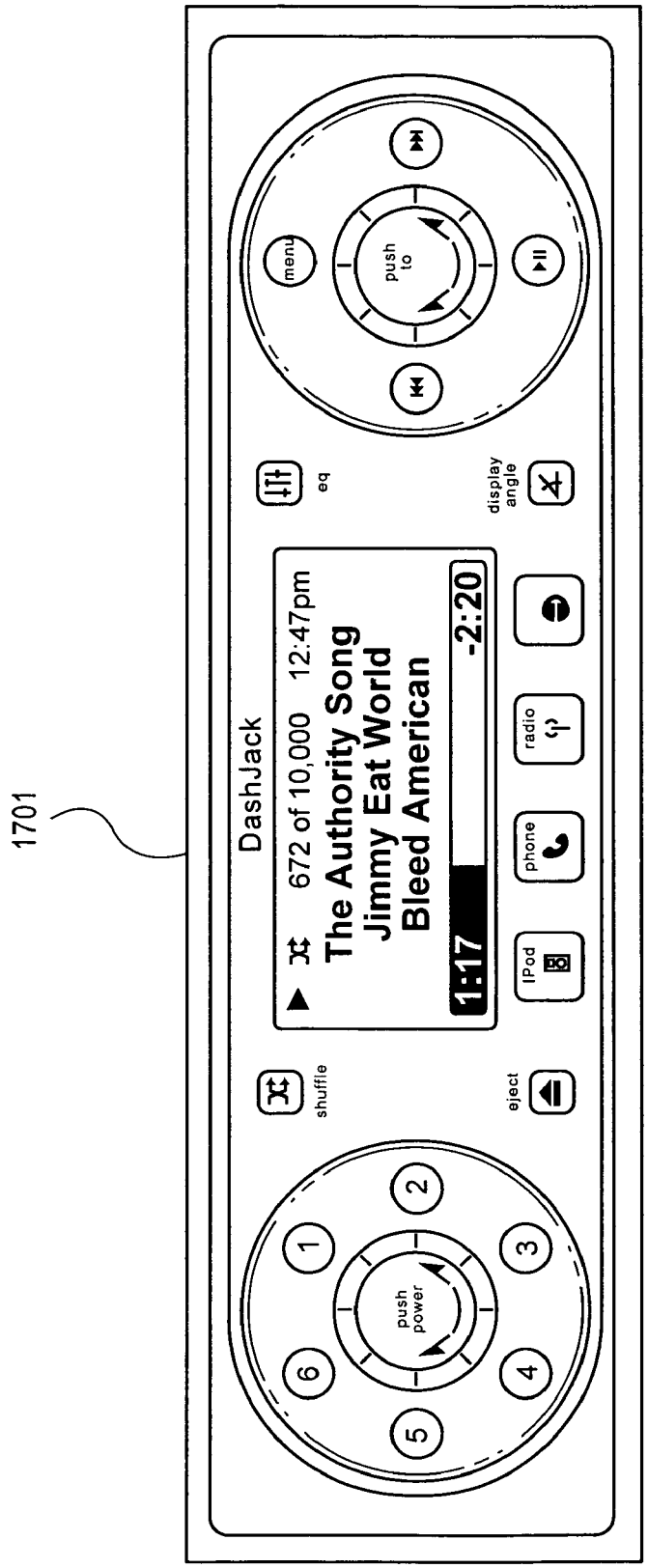
FIG. 17 illustrates an embodiment of a movable faceplate.

The movable faceplate 1401 is depicted in greater detail in FIG. 15. FIG. 16 depicts an alternative embodiment of the faceplate 1601. FIG. 17 depicts yet another embodiment of the faceplate 1701. A display 1501 presents information relevant to a mode of operation. Several modes of operation may be made accessible by using input devices of the faceplate 1401. In one embodiment these input devices are buttons. Modes of operation accessible include, but are not limited to, a portable digital music player 1503, radio 1505, telephone 1507, and auxiliary 1509. In one embodiment, the buttons are customizable allowing the mapping of a button to a particular operation, function, or task. By way of example, if an auxiliary device is not in communication with the audio system, the button corresponding to the auxiliary device function 1509 is mapable to be a shortcut to a favorite artist or song.

In one embodiment of the standby mode, the display 1501 may be made to show the current time and date. This is the default mode of operation when no other mode has been selected. Time and date may also be shown as a component of the display when other modes are selected.

Upon selecting portable digital music player mode 1503, the display 1501 may present several pieces of information. This information includes, but is not limited to, track name, album name, artist name, album art, number of songs, amount of used and free storage space, make, model, and personalized name of the portable digital audio device, shuffle indication, time, track duration, track mark, player setup menu, the folder hierarchy when searching for songs, portable digital music player status, and indications of play, pause, stop, forward, reverse, and track skip.

The display 1501 shows the radio station frequency at least during a portion of radio operation 1505. In one embodiment, the audio system acquires digital information to display additional information about the station, music, etc. Digital information technologies include, but are not limited to, Radio Data System (RDS), iBiquity Digital Corporation's In-Band On-Channel (IBOC), and Digital Audio Broadcasting (DAB).

Additionally, in one embodiment, the display 1501 may also depict a music visualizer, graphic equalizer, error messages, news, weather, digital images, games, maps, driving directions, or vehicle diagnostics.

In one embodiment the display 1501 is color. In an alternative embodiment, the display 1501 is monochrome. Many display technologies may be utilized to make the display 1501 and include, but are not limited to, STN LCD, TFT, Plastic TFT, Organic LED, and LED.

Several functions are accessible through the faceplate 1401. These include, but are not limited to, ejecting the portable digital music player 1511, adjusting the faceplate angle 1513, sound equalizer 1515, and shuffle content 1517.

In equalizer function 1515, the display 1501 depicts the equalizer values of the audio system, which may be custom set or preset. The equalizer values are changeable with the navigation multi-control 1519. In one embodiment, the equalizer values of the player are used by the audio system.

The faceplate 1401 is moveable by selecting the eject function 1511. In one embodiment, a motor housed internal to a chassis is activated and the faceplate 1401 moves automatically allowing access to the internal cavity. In another embodiment, a motor in the dock is activated to automatically move the faceplate 1401. In another embodiment, the faceplate 1401 is manually moveable. In yet another embodiment, the faceplate 1401 is completely detachable.

In one embodiment, the faceplate is adjustable. Adjusting the faceplate angle 1513 is important due to the variances in vehicle designs and lighting conditions. Using this function 1513, a faceplate may be adjusted such that the faceplate angle is in a desired position. The faceplate may adjust either continuously, or through a number of preset angles, such as zero, 30, 60 and 90 degrees. In another embodiment, the audio system may sense the lighting conditions and automatically adjust the angle of the faceplate accordingly.

Sound settings for the audio system, as described earlier are adjustable with the sound equalizer function 1515. The shuffle content function 1517 randomizes the songs stored on the portable digital music player for playback.

The faceplate includes a navigation multi-control 1519 for navigation during each mode of operation or function. During radio mode, the multi-control 1519 provides for functionality that includes, but is not limited to, tuning to a particular frequency and changing frequency bands (AM/FM). During portable digital music player mode, the multi-control 1519 provides for functionality that includes, but is not limited to, hierarchical/content navigation, select, play, pause, track forward, track back, fast forward, reverse, and menu. In one embodiment, the multi-control 1519 includes buttons 1521 for at least some of the above mentioned functionality. During auxiliary mode, the multi-control 1519 allows for controlling of the external device. In one embodiment, the audio system provides an audible indication of the audio system's status during the use of the multi-control 1519. For example, during portable digital music player mode, an audible indication will alert the user to the section of list that is being navigated. When the user is in the "A's" the letter audio system will declare "A" to the user and so on. In one embodiment, the audio system audibly indicates the selection if no action has been taken regarding that selection after a predetermined period of time.

In one embodiment, the multi-control 1519 simulates a continuous knob rotation instead of providing that capability. During vehicle operation it may be difficult for a user to continually rotate the multi-control 1519 to reach the desired position. Instead, a series of small turns is used. Generally these turns would occur in rapid succession, however, that is not necessary. The user rotates the multi-control 1519 and if less than a minimum threshold of time goes by until the next rotation, this next rotation is considered a part of the same motion, hence, the simulation of continuous movement. In another embodiment, the multi-control does provide continuous rotation.

A volume control 1525 is included in the faceplate 1401. In one embodiment, this volume control 1525 also serves as a power switch. In one embodiment, a master volume level is set for all audio system functions. In an embodiment, each function may have its own volume setting. In one embodiment, the audio system may adjust the volume dynamically, based on vehicle conditions such as speed and ambient noise. In one embodiment, the underlying baseline volume is adjustable. Traditional radio preset 1527 capabilities may also be provided.

In an embodiment, the faceplate 1401 has receptacles for portable storage devices containing digital music, files, or microcode. Exemplary portable storage devices include, but are not limited to, USB flash drives, CompactFlash, SmartMedia, Memory Sticks, Secure Digital (SD) memory cards, and xD memory cards. In one embodiment these devices store music files that are then made accessible for playing through the audio system. In an embodiment, these devices store at least one file or microcode that is used to upgrade the firmware of the audio system.

In one embodiment, at least a portion of the faceplate 1401 is depicted on a solidstate device such as a touchscreen panel. The touchscreen panel may include a virtual representation of the portable digital music player including the relevant controls. For example, a virtual representation of an iPod would include a scrollwheel that controls the functionality of the player in much the same manner as if the actual iPod were available for a user to manipulate. In one embodiment, the player controls are enlarged or otherwise modified to be better suited to the environment of a vehicle.

In one embodiment, the faceplate includes an integrated microphone 1523. This microphone 1523 may be used for any combination of voice navigation, control of the audio system, telephone functions, and sensing of ambient noise level.

Figure 21:
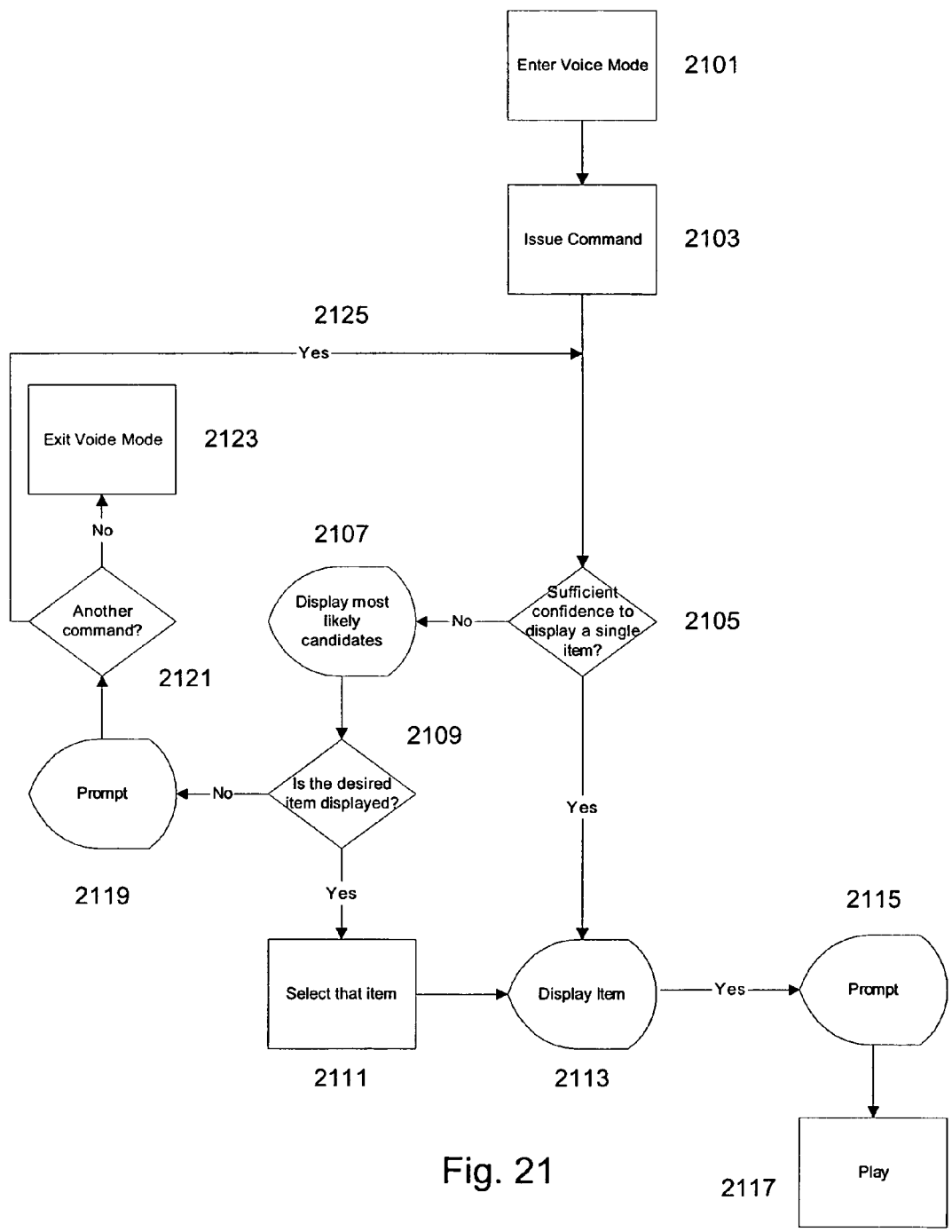
FIG. 21 is flow diagrams of embodiments of a telephone mode during music playback.

In addition to accessing each of the modes of operation by using the faceplate 1401 and manually adjusting the settings, in one embodiment the modes of operation are accessible and navigatable through the use of voice commands. FIG. 21 is a flow diagram of one embodiment of voice mode. In one embodiment, voice mode is initiated 2101 by the audio system receiving a keyword or phrase. In another embodiment, the voice mode is initiated 2101 by the depression of a mode or functional button for a set amount of time. For example, to enable voice recognition for the portable digital music player mode of operation the corresponding button 1503 is depressed for a set period of time. In one embodiment, an audio and/or visual prompt notifies signals that the voice mode is active. Upon entering voice mode 2101, a user issues a command 2103 and the audio system receives the command. The microphone 1523 receives this command and the audio system processes it. Exemplary commands include but are not limited to, accessing an artist, album, playlist, genre, composer, or rating. If there is sufficient confidence by the programming of the audio system to display the correct item 2105 based upon the voice command, the item will be displayed 2113. However, if there is not sufficient confidence that the correct item may be displayed, a list of most likely candidates is displayed 2107. If the desired item is displayed within that list 2109, the user may then select by voice the item 2111 and that item will be displayed 2113. Once the proper item is displayed a prompt to make a selection regarding that item 2115 will be displayed or audibly provided. Exemplary selection options promptable include, but are not limited to, linear playback, shuffle playback, or playing a specific song. After the selection has been received by the audio system, playback is started. In one embodiment, the selection is automatically played without further selection. In this embodiment, playback may be interruptible to allow another action to be performed. If the desired item is not displayed 2109, a prompt is generated to indicate that no match was found and that the command 2119 should be repeated. If a new command is spoken or the last command repeated, the audio system will again decide if there is sufficient confidence to display a single item 2125. However, if no command is issued, voice mode will stop and normal operation will resume.

Figure 23:
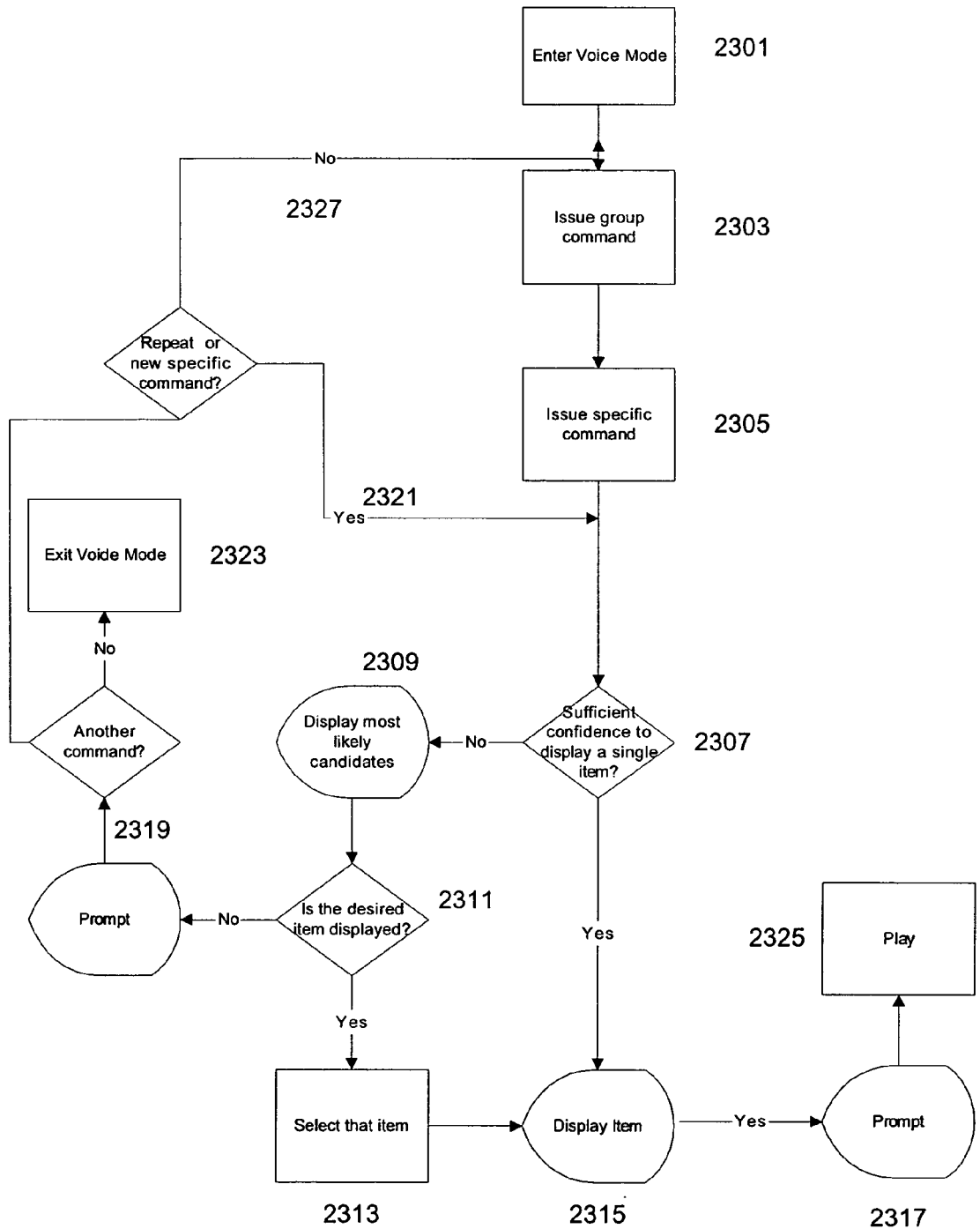
FIG. 23 is a flow diagram of another embodiment of voice mode.

FIG. 23 is a flow diagram of another embodiment of voice mode. Upon entering voice mode 2301, a user issues a group command 2303. Exemplary group commands include, but are not limited to, accessing artist, album, playlist, genre, composer, rating groups, and letter groups. By first selecting the group that the user wants to access, a smaller set of filenames need to be searched for a match. For example, the player may have ten (10) artists with two (2) albums each. If each album has ten (10) songs, that means there are 230 items to search: 200 songs, 10 artists, and 20 albums. Each group is less than that. For example, if the user selects the group "artists," then only 10 possible items need to be checked for a match. By way of another example, if the user selects the letter "A" then only those items that begin with "A" would be searched. The ability to accurately recognize the specific selection may increase with a smaller set of filenames to be search. After selecting a group 2303, the user then issues a more specific command for a particular song, artist, album, playlist, genre, or composer 2305. If there is sufficient confidence to display the correct item 2307 based upon the user's voice command, the item will be displayed 2315. However, if there is not sufficient confidence that the correct item may be displayed, a list of most likely candidates is displayed 2309. If the desired item is displayed within that list 2311, the user may then select the item 2313 and that item will be displayed 2315. Once the proper item is displayed, the user will be prompted to make a selection regarding that item 2317. Exemplary selection options prompted to the user include but are not limited to linear playback, shuffle playback, or playing a specific song. Once the user has made a selection, playback is started 2325. In one embodiment, the selection is automatically played without further selection. In this embodiment, playback may be interruptible to allow another action to be performed. If the desired item is not displayed 2311, a prompt is generated to indicate that no match was found and that the user should repeat the command 2319. At this point a user may issue a new group command 2327, issue a new specific command 2321, or reissue the first specific command 2321. However, if no command is issued, voice mode will stop and normal operation will resume 2323.

Voice mode may also be used for radio station tuning. By way of example, the user could utter "94 point 1" and tune to 94.1, or utter "KFOG," or utter "preset 1."

In one embodiment, modes of operation further include telephone operation 1507. In telephone operation 1507, the presentation of the display 1501 includes, but is not limited to, call number, call duration, signal strength, time, date, and the current network that the phone is on. In one embodiment, during telephone mode, the selection of phone numbers is through the multi-control 1519. A "hands-free" telephone communication using the integrated microphone 1523 and vehicle speakers uses a telephone connection provided by a wireless communications device such as a wireless telephone. In one embodiment, the telephone and audio system are interfaced using a wired connection. In another embodiment the telephone and audio system are interfaced wirelessly. Exemplary communication protocols for wireless connection are Bluetooth ™ (IEEE 802.15.1) and the IEEE 802.11 family. The microphone 1523 of the faceplate is substituted for the microphone of the telephone and the speakers of the vehicle are substituted for the speaker of the telephone. In one embodiment, the display of the audio system changes color and/or brightness to indicate an incoming call.

In one embodiment, the wireless communications device may be made to display at least a portion of the controls and display that are available to the faceplate 1401. This includes, but is not limited to, display of the wireless communication device mirroring the available faceplate 1401 display and the controls and buttons of the wireless communications device being used as controls for the audio system. This would allow a passenger that may not have convenient access to the head-end unit the ability to control of the audio system.

Figure 22:
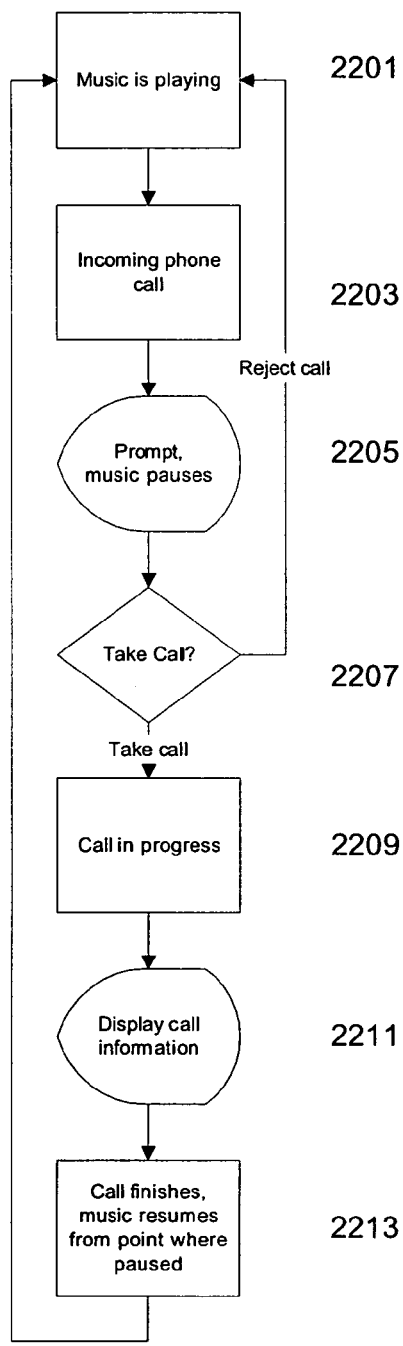
FIG. 22 is a flow diagram of an embodiment of voice mode.
Figure 22:
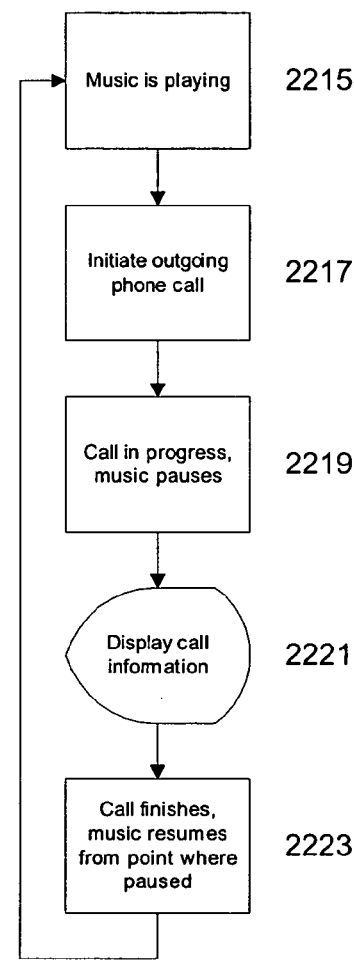

FIG. 22 illustrates exemplary flow diagrams of embodiments of a telephone mode during music playback. For an incoming call 2203 that occurs while music is playing 2201 a prompt 2205 about the existence of the call is generated. Exemplary prompts include, but are not limited to, displaying caller ID information and/or an audio alert. At this point, in one embodiment, if there is music playing using the player, the player is paused. Extended caller information may be shown if the caller ID matches information stored in the phone book of the audio system, player, or phone. A user then decides whether or not to take the call 2207. If the call is rejected, either through an explicit user interaction or by waiting for the call to stop ringing, the music will resume playing. If the call is taken, the music is paused 2209. In one embodiment, the call is deemed taken after an oral indication given by the user. In one embodiment, the call is taken by depressing a button. For example, the telephone operation 1507 button. The display may also be made to display information about the call 2211. Such information includes, but is not limited to, call duration, and caller identification. In one embodiment, the display also shows song information. When the call is completed, the music resumes from the point at which it was paused 2213.

To make an outgoing call during music playback 2215, telephone operation is initiated 2217. In one embodiment, the operation is initiated by selecting the telephone operation 1507 button. Once in telephone operation, a telephone number may be dialed. Dialing a telephone number may comprise selection of the telephone number digit by digit or selecting a stored telephone number from a list with the multi-control 1519. In one embodiment, the number is dialed using the communication capability of the wireless communications device. After the number has been dialed the telephone call operations are turned over to the audio system. In another embodiment, the operation is initiated by depressing the telephone operation 1507 button for a set period of time and entering voice mode. Once in this mode, music is paused or muted, and voice commands may be used to dial the desired number. In each case, the number may be input directly as a number or if the number is associated with a telephone contact that information is used. In one embodiment, the audio system stores telephone contact information. When the call is in process, the music playback remains paused 2219 and the display 1401 shows call information 2221. In one embodiment the display also shows song information. Upon completion of the call, music playback is resumed.

Figure 18:
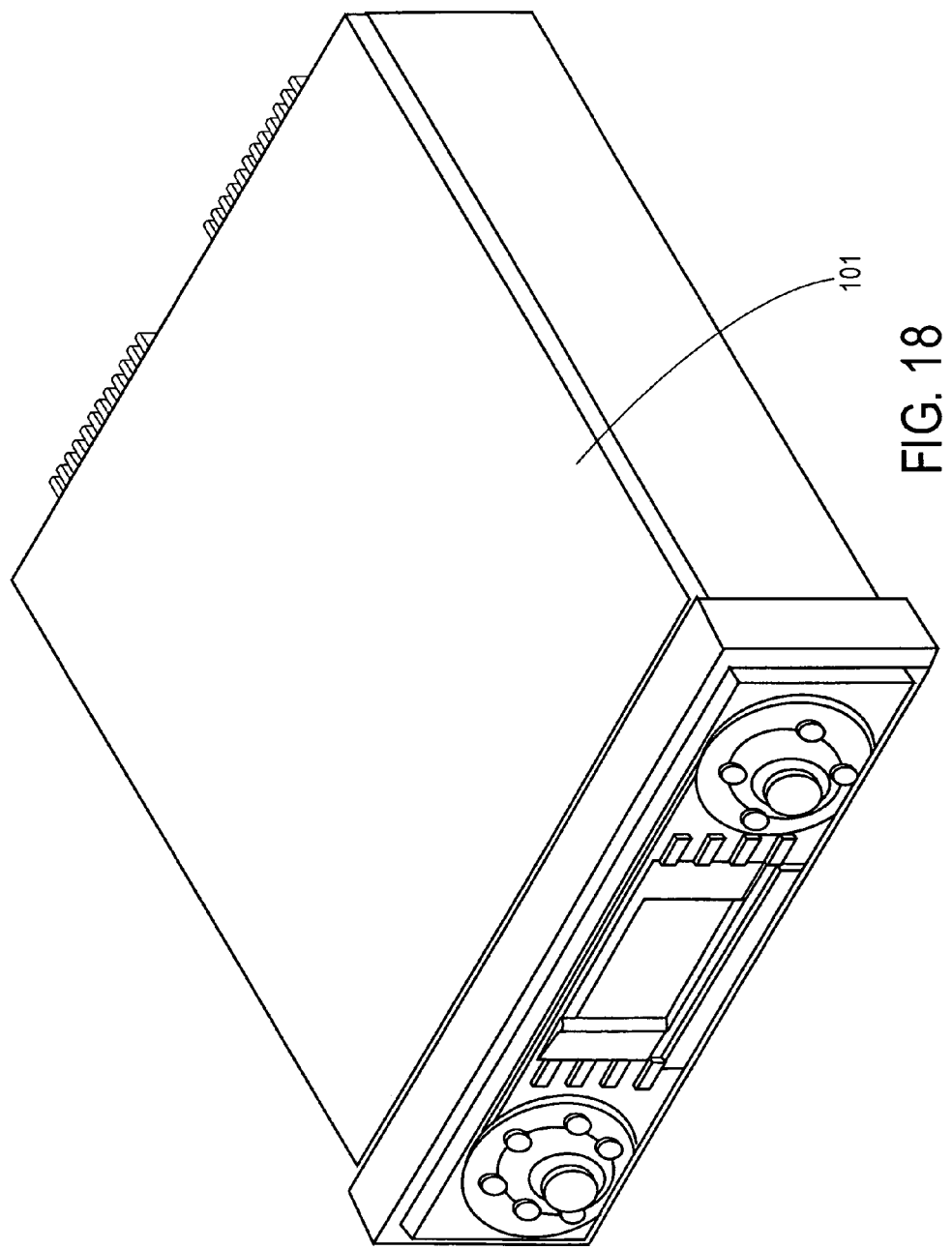
FIG. 18 depicts an embodiment of the audio with a chassis.

In one embodiment, the vehicle audio system further includes a chassis 1801 as depicted in FIG. 18. The chassis 1801 encases the necessary mechanical and electrical components of the audio system, including the carriage, carriage dock, and PCB. The chassis 1801 also allows for installation into a dash of a vehicle. In one embodiment, the chassis is standard DIN body size (2" high by 7" wide). DIN body size is adaptable to fit many vehicles today. In another embodiment, the chassis 1801 is Double DIN size (4" high by 7" wide). In yet another embodiment, the chassis 1801 is a non-DIN body size designed to either fit a specific model vehicle that does not use DIN, or a size that is designed to be incorporated inside an existing chassis that is already designed fit into a DIN, Double DIN, or non-DIN slot in a vehicle.

Figure 19:
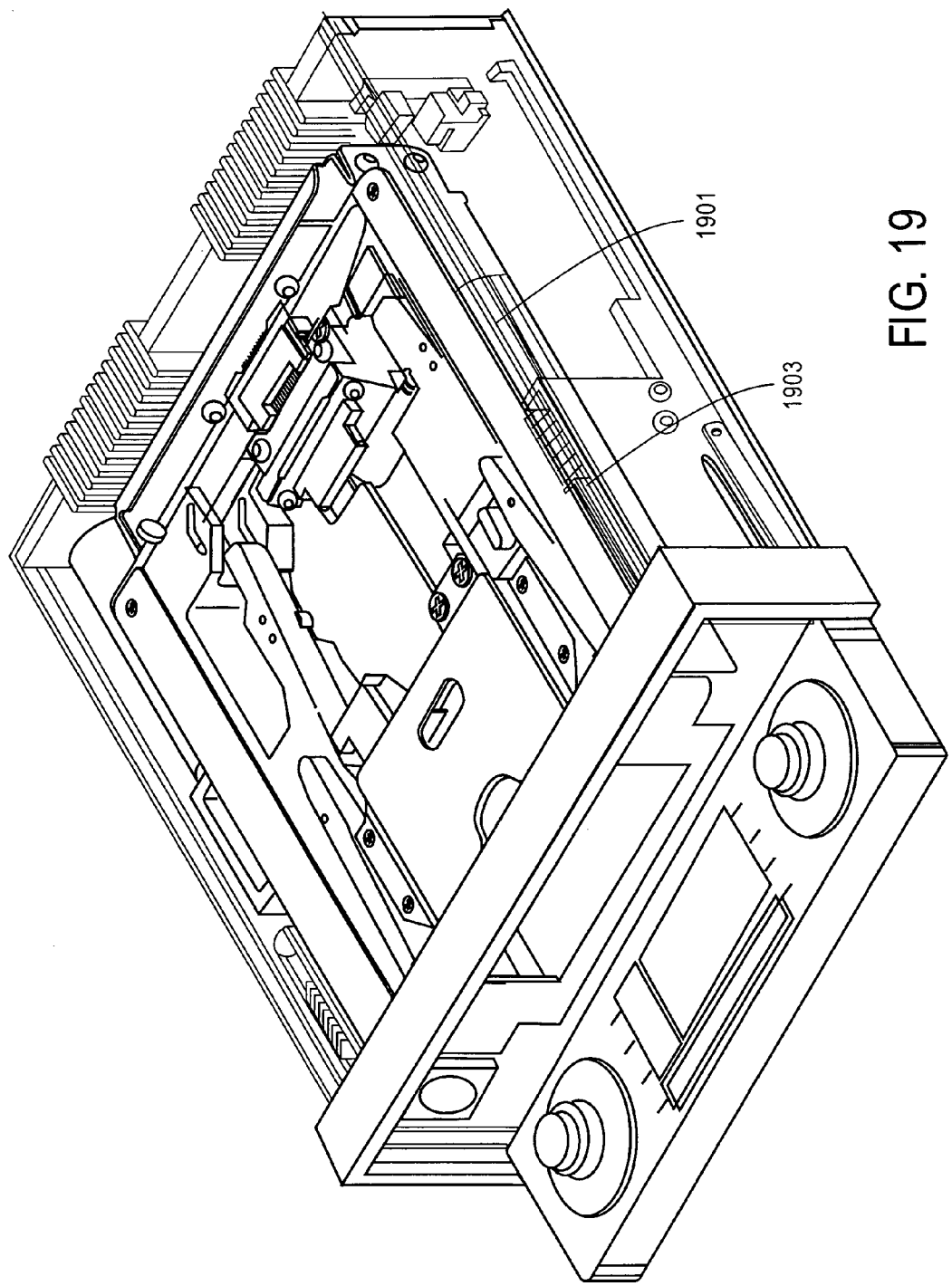
FIG. 19 illustrates an exemplary embodiment of a motor and transmission to facilitate movement of a movable faceplate.

In one embodiment, as illustrated in FIG. 19, the chassis 1801 includes a motor 1901 and transmission 1903 to facilitate automated movement of the faceplate 1401. The motor 1901 and 1903 are coupled with the faceplate 1401. In an embodiment, the faceplate is moved from its closed position to an open position in front of and below the carriage 103 allowing the carriage 103 to be removable from the carriage dock 101. Of course, the faceplate 1401 could be moved to an open position in front of and above the carriage 103 so long as the carriage 103 is removable from the carriage dock 101. In another embodiment, the dock provides the faceplate movement capability.

Figure 20:
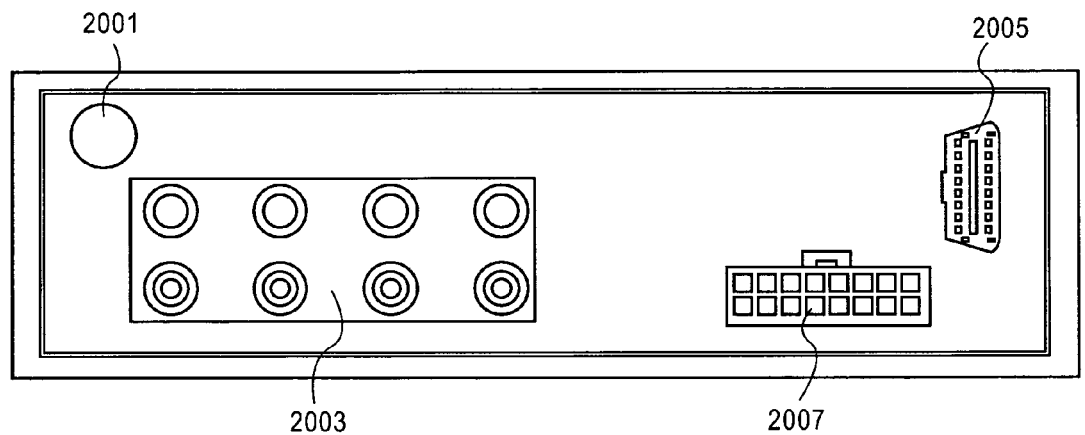
FIG. 20 depicts an exemplary embodiment of the rear of the audio system with a chassis.

Turning now to FIG. 20, an exemplary rear of the audio system with a chassis 1801 is depicted. In this exemplary embodiment, an external antenna connection 2001, audio line level inputs and outputs 2003, external control connection 2005, and wiring harness to the vehicle system 2007 are included. However, the connectivity provided may be adjusted to meet non-standard protocols that individual vehicle manufacturers may have. The wiring harness connectivity 2007 may include, but is not limited to, connections for power to the audio system, amplified speaker signals, and mute control from an external audio device. An example of an external control connection 2005 is OBD-II (On-Board Diagnostic), which is prevalent in most newer cars (especially those made after Jan. 1, 1996). For vehicle audio systems, OBD-II provides for communication between the audio system unit and controls external to the audio system such as steering wheel controls.

In one embodiment, the audio system includes at least one remote operational control capability. Exemplary remote control technologies include, but are not limited to, a wireless remote specific to the audio system, a wired remote specific to the audio system, a third-party wired remote, a third-party wireless remote, on-board vehicle controls (e.g., steering wheel controls), and control from a wireless communications device.

The audio system may also support several variants of power management. In one embodiment, the audio system has an internal power source. Interruption of the operation of the player and/or audio system during the starting of the vehicle is prevented by using the internal power source. The audio system could otherwise reboot during startup. Additionally, the power source may be used in the mechanical ejection of the player, even if the vehicle's main battery dies. In one embodiment, during normal operation, the power source recharges using the electrical system of the vehicle.

The audio system may be used when the vehicle is off. In one embodiment, the audio system further supports power management features to ensure that the battery of the vehicle is not completely drained. An embodiment of power management for the audio system uses a voltage sensor to turn off the audio system when the vehicle's battery level reaches a predetermined point. In another embodiment, a timer is set that turns off the audio system after a set period of time. This amount of time may be adjustable using the setup functionality of the audio system.

Additionally, the player may be removed from the audio system with the power of the vehicle off. In one embodiment, the player is automatically ejected once the power of the vehicle is turned off. The automatic eject capability may be disabled. In another embodiment, the player must be manually ejected.

A sleep mode is included in one embodiment of the audio system. Sleep mode is automatically entered into when the audio system is turned off. This mode maintains at least one state of the audio system. The use of sleep mode reduces the boot time of the audio system. By way of example, if the audio system runs the Linux operating system, the operating system supports sleep mode, and resuming operation from sleep mode is faster than a complete system boot. In another embodiment, the audio system runs an embedded operating system that boots quickly enough so that sleep mode is not necessary. Exemplary embedded operating systems include, but are not limited to, eCos, Microsoft Windows CE, Microsoft XP Embedded, and embedded Linux variants.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions.

The foregoing description has been directed to specific embodiments. It will be apparent, however, that other variations and modifications may be made to the described embodiments, with the attainment of some or all of their advantages. Additionally, procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A carriage, comprising:
   an external housing to provide a mechanical engagement of the carriage into a dock;
   an internal cavity to receive and house a portable digital music player, wherein the dimensions of the internal cavity are adjustable based on the dimensions of the portable digital music player; and
   a first connector specific to the portable digital music player disposed within the cavity to cooperatively engage a second connector external to the carriage.

2. The carriage of claim 1, further comprising:
   a sensor to determine if the portable digital music player has been properly received by the carriage.

3. The carriage of claim 1, wherein the first connector specific to the portable digital music player is an industry standard connector.

4. The carriage of claim 1, wherein first the connector specific to the portable digital music player is a proprietary connector.

5. An audio system to provide at least one mode of operation, comprising:
   a dock to receive a carriage;
   a carriage defining an internal cavity to receive a portable digital music player, wherein the carriage includes,
      a connector specific to the portable digital music player disposed within the cavity to cooperatively engage the digital music player, and
      an external housing to provide a mechanical engagement of the carriage into the dock;
   a movable faceplate to attach to the dock, the movable faceplate to provide access to at least one mode of operation of the audio apparatus, wherein the at least one mode of operation is selected from the group of: radio, auxiliary, portable digital music player, and wireless communication; and
   an external chassis to attach to the dock, wherein the chassis includes, an external antenna connection, audio line level inputs and outputs, an external control connection, and a wiring harness to a vehicle.

6. The audio system of claim 5, wherein the movable faceplate is operable to offer a user interface.

7. The audio system of claim 5, wherein the movable faceplate further includes a microphone in communication with at least one mode of operation of the audio system.

8. The carriage of claim 5, further comprising:
   at least one pawl to grip the portable digital music player.

9. The carriage of claim 5, further comprising:
at least one pushrod to help secure the portable digital music player.

10. The carriage of claim 5, further comprising:
a movable shuttle to hold the portable digital music player.

11. The shuttle of claim 10, further comprising:
at least one pawl to grip the portable digital music player.

12. The shuttle of claim 10, further comprising:
at least one pushrod to help secure the portable digital music player.

13. A system, comprising:
a portable digital music player to provide digital music files and data;
a dock to receive a carriage, wherein the dock includes a dock connector to cooperatively engage with a connector external to the carriage;
a movable faceplate to attach to the dock, the movable faceplate to provide access to at least one mode of operation, wherein the movable faceplate is operable to offer a user interface;
a external chassis to attach to the dock, wherein the chassis includes an external antenna connection, audio line level inputs and outputs, an external control connection, and a wiring harness to a vehicle; and
the carriage to receive the portable digital music player the carriage including,
an internal connector specific to the portable digital music player disposed within a cavity of the carriage,
the connector external to the carriage to cooperatively engage the carriage to the dock connector when the carriage is inserted into the dock, and
an external housing to provide a mechanical engagement of the carriage into the dock.

14. The system of claim 13, wherein the mode of operation includes at least one from the group of: radio, auxiliary, portable digital music player, and wireless communication.

\* \* \* \* \*